(12) United States Patent
Edeki et al.

(10) Patent No.: US 7,647,645 B2
(45) Date of Patent: Jan. 12, 2010

(54) SYSTEM AND METHOD FOR SECURING COMPUTER SYSTEM AGAINST UNAUTHORIZED ACCESS

(76) Inventors: Omon Ayodele Edeki, 1100 E. 32nd St., # 112, Austin, TX (US) 78722; Odion Ayotunde Edeki, 1100 E. 32nd St., # 112, Austin, TX (US) 78722; William Roy Natale, 9408 Zyle Rd., Austin, TX (US) 78737

( * ) Notice: Subject to any disclaimer, the term of this patent is extended or adjusted under 35 U.S.C. 154(b) by 580 days.

(21) Appl. No.: 10/898,129

(22) Filed: Jul. 23, 2004

(65) Prior Publication Data

US 2005/0097364 A1     May 5, 2005

Related U.S. Application Data

(60) Provisional application No. 60/489,462, filed on Jul. 23, 2003.

(51) Int. Cl.
*G06F 7/04* (2006.01)
*G06F 17/40* (2006.01)
*G06F 21/00* (2006.01)
*G08B 23/00* (2006.01)

(52) U.S. Cl. ............................... 726/28; 726/2; 726/22; 713/186

(58) Field of Classification Search .................. 726/27, 726/28, 26, 4, 2, 3, 5, 6, 22, 23, 24, 25; 713/183, 713/182, 186, 184, 185; 704/257, 273, 231; 382/120; 340/5.8, 5.81, 5.82, 5.84, 5.85

See application file for complete search history.

(56) References Cited

U.S. PATENT DOCUMENTS

| 6,134,657 A * | 10/2000 | Johnson et al. ............. 713/168 |
| 6,708,212 B2 * | 3/2004 | Porras et al. ................ 709/224 |
| 7,007,067 B1 * | 2/2006 | Azvine et al. ............... 709/206 |
| 7,149,698 B2 * | 12/2006 | Guheen et al. ................ 705/1 |
| 2003/0084345 A1 * | 5/2003 | Bjornestad et al. .......... 713/201 |

(Continued)

OTHER PUBLICATIONS

Souheal et al. "Fusion of Face and Speech Data for Person Identity Verification", vol. 10, No. 5 Sep. 1999 IEEE pp. 1065-1074.*

(Continued)

*Primary Examiner*—Eleni A Shiferaw
(74) *Attorney, Agent, or Firm*—Jackson Walker L.L.P.

(57) ABSTRACT

The present invention described secures a computer account against unauthorized access caused as a result of identity-theft, and insider-espionage using artificial intelligence and behavioral modeling methods. The present invention has the ability to detect intruders or impersonators by observing "suspicious" activity under a computer account. When it sees such suspicious behavior, it uses artificial intelligence to authenticate the suspect by interrogation. The present invention asks the suspect questions that only the legitimate computer account owner can verify correctly. If the suspect fails the interrogation, that proves that he/she is an impersonator and therefore further access to the computer account is denied immediately. On the other hand if the suspect passes, access to the computer account is restored. The present invention uses a Programmable Artificial Intelligence Engine (PAIE) to interact with computer users in human natural language. The PAIE can also be programmed to suit other applications where natural language interaction with humans is helpful.

1 Claim, 24 Drawing Sheets

U.S. PATENT DOCUMENTS

| | | | |
|---|---|---|---|
| 2003/0200464 A1* | 10/2003 | Kidron | 713/201 |
| 2004/0103296 A1* | 5/2004 | Harp et al. | 713/200 |
| 2004/0117371 A1* | 6/2004 | Bhide et al. | 707/9 |
| 2004/0210661 A1* | 10/2004 | Thompson | 709/228 |
| 2004/0239700 A1* | 12/2004 | Baschy | 345/781 |
| 2005/0097364 A1* | 5/2005 | Edeki et al. | 713/201 |
| 2006/0026159 A1* | 2/2006 | Dettinger et al. | 707/9 |
| 2006/0117384 A1* | 6/2006 | Larson et al. | 726/22 |
| 2006/0235948 A1* | 10/2006 | Bjornestad et al. | 709/219 |
| 2007/0156677 A1* | 7/2007 | Szabo | 707/5 |

OTHER PUBLICATIONS

Jon Doyle "Strategic Directions in Artificial Intellignece" vol. 28, No. 4 Dec. 1996 pp. 653-670.*

* cited by examiner

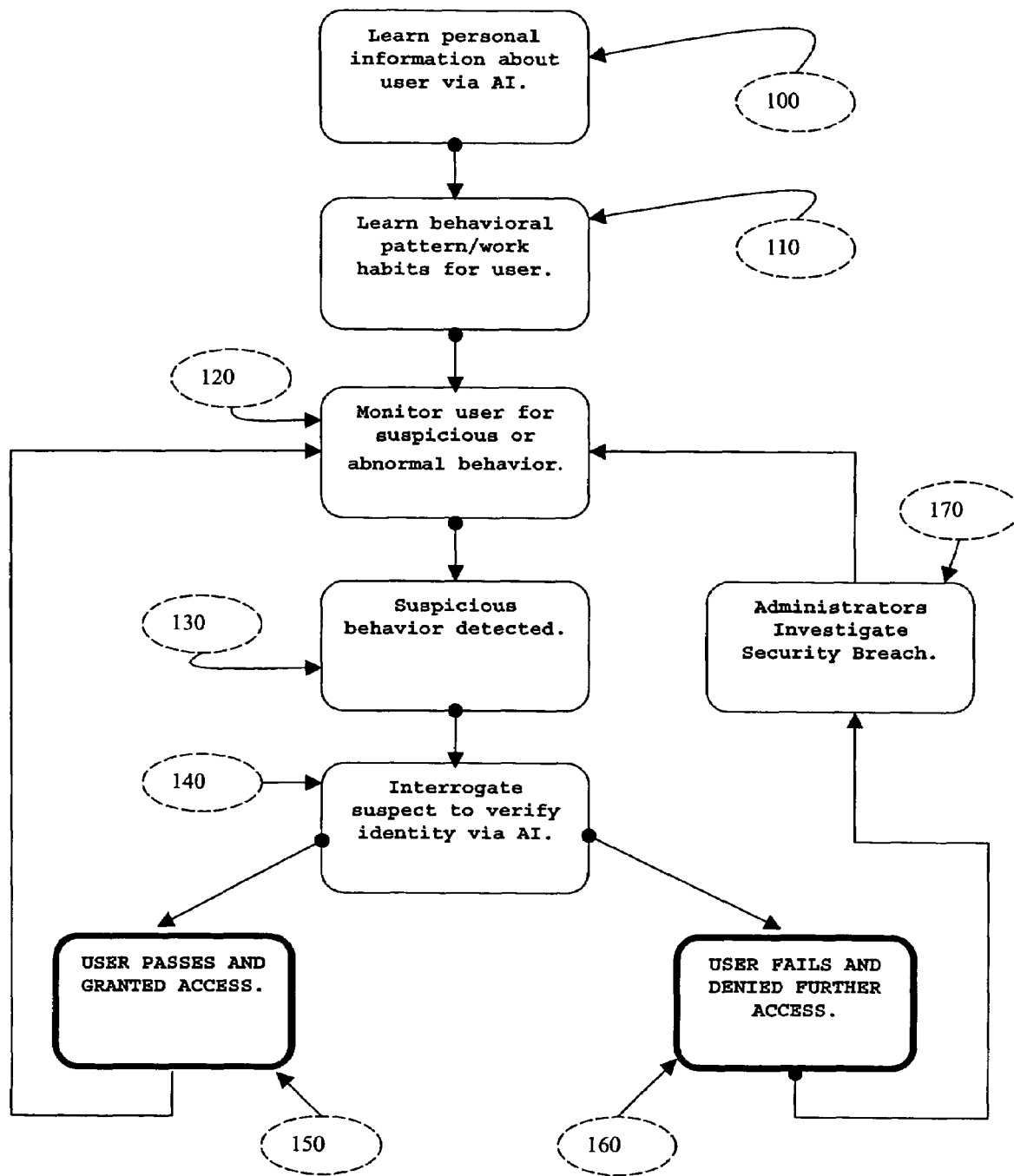
FIG. 1 - Flow Diagram of the Present Invention Securing a User's Computer Account.

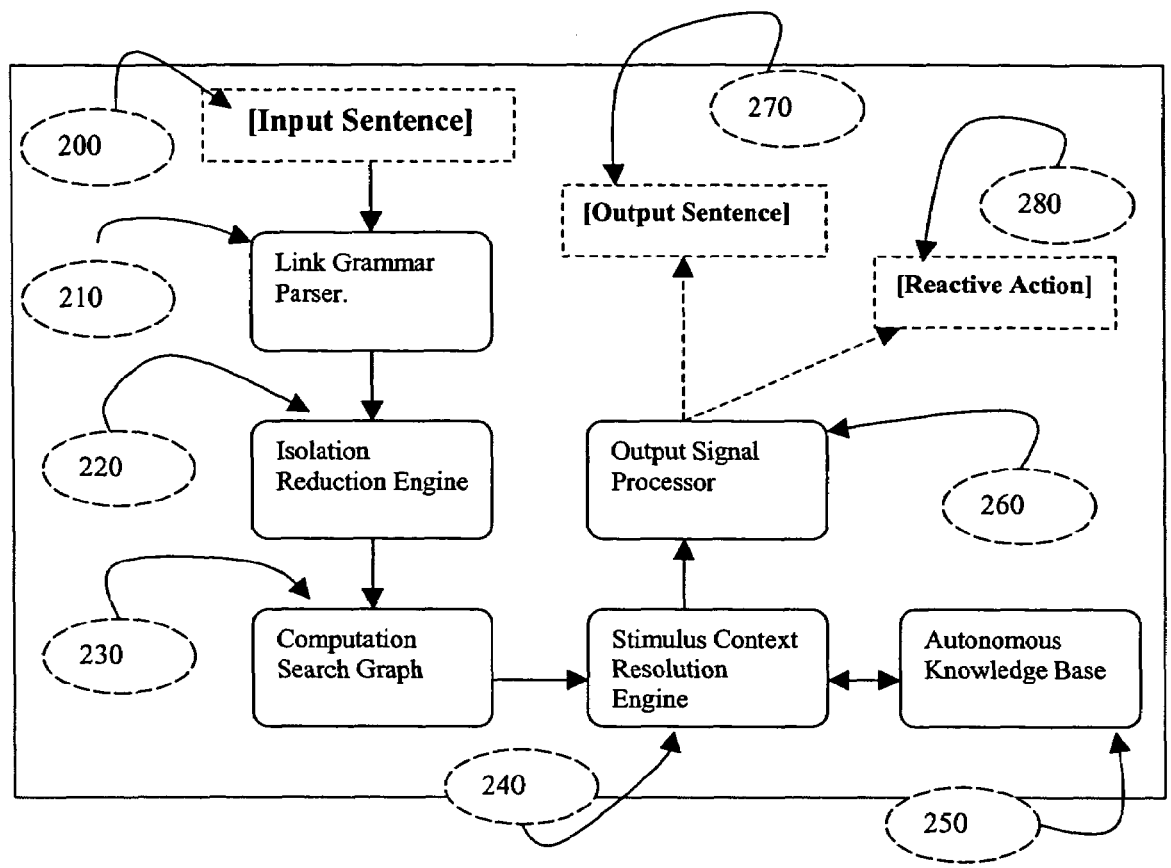
FIG. 2 - Programmable Artificial Intelligence Engine (PAIE).

FIG. 3 – Array of Sentences Representing A Sequence of Input Sentences Generated by A Human User in A Normal Conversation.
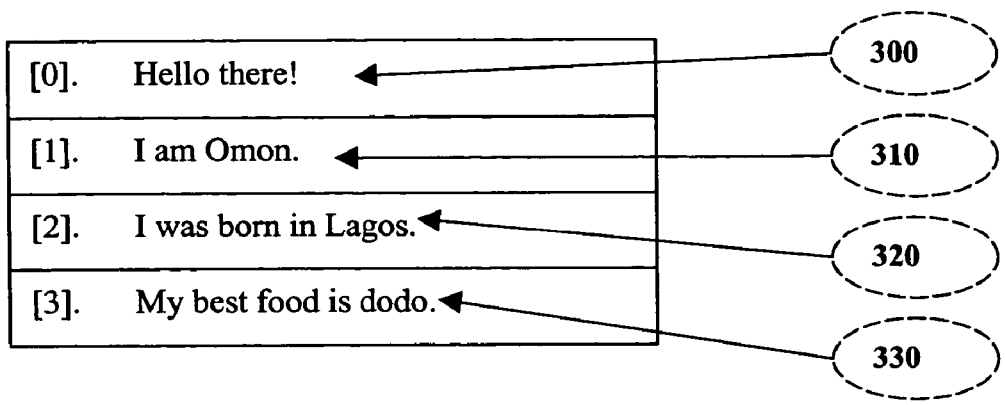

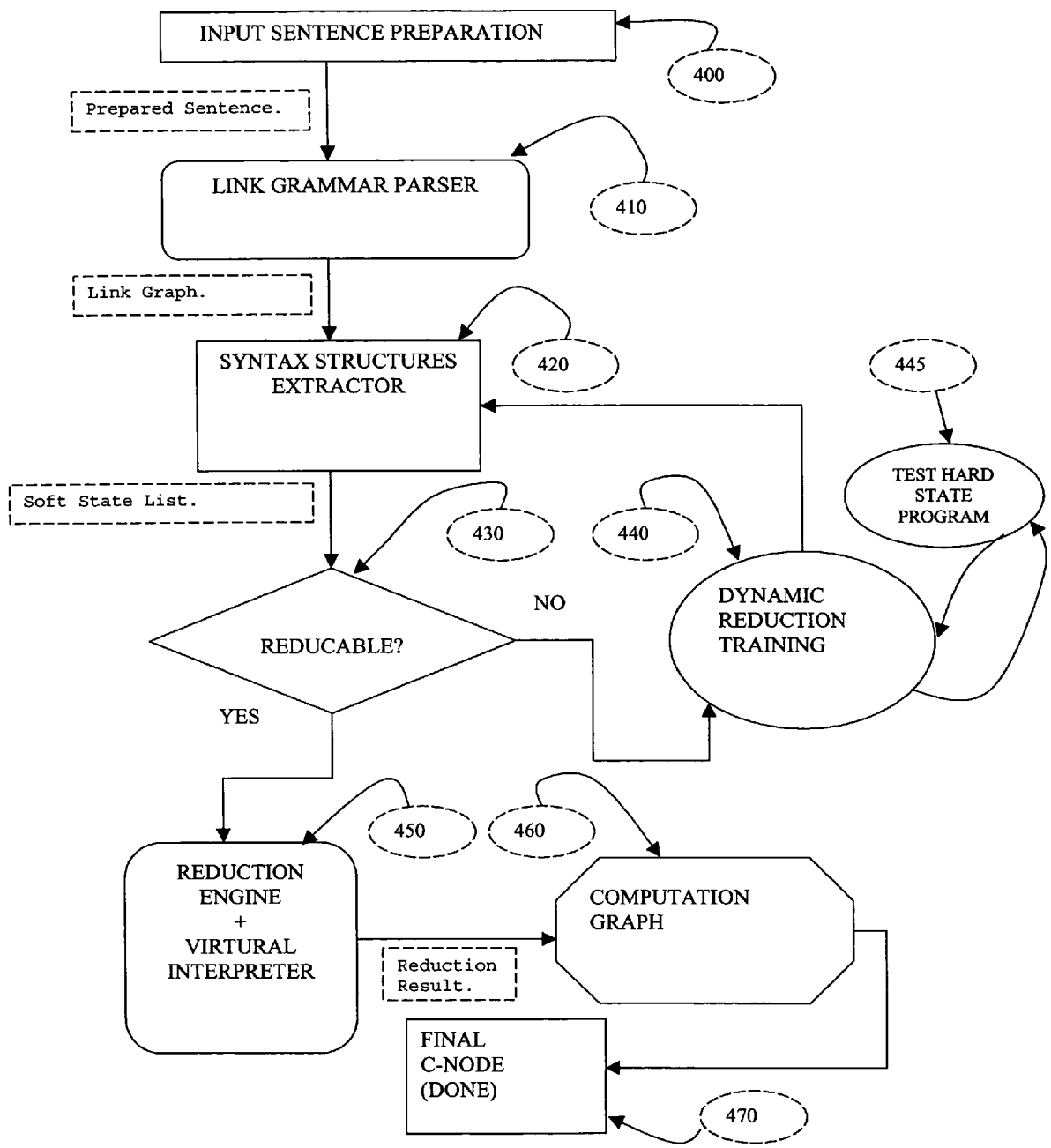
FIG. 4 – Isolation Reduction Engine.

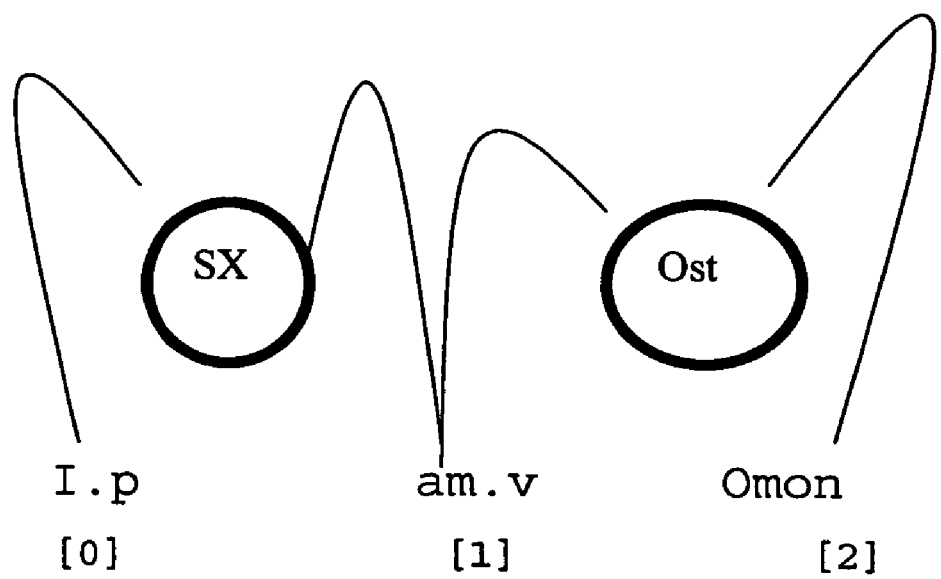
FIG. 5 – Example of a Link Graph For a sentence.

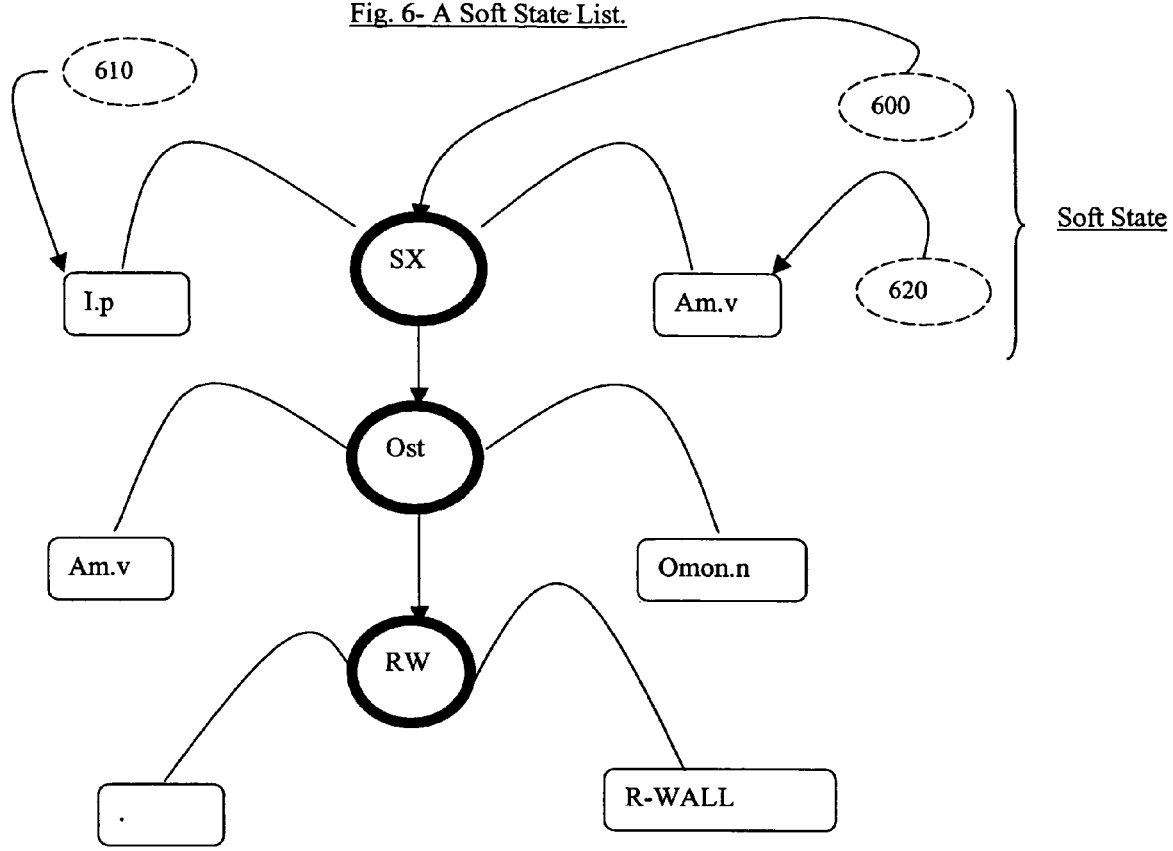
Fig. 6- A Soft State List.

Fig. 7 – A Data Representation of a Soft State List

```
num_words_in_linkage:5
num_of_links:4
```

```
Connector: RW
right.word.index: 4
left.word.index: 0
right_word: RIGHT-WALL
left_word: LEFT-WALL
```
Soft State 0

```
Connector: Wd
right.word.index: 1
left.word.index: 0
right_word: I.p
left_word: LEFT-WALL
```
Soft State 1

```
Connector: SX
right.word.index: 2
left.word.index: 1
right_word: am.v
left_word: I.p
```
Soft State 2

```
Connector: Ost
right.word.index: 3
left.word.index: 2
right_word: Omon
left_word: am.v
```
Soft State 3

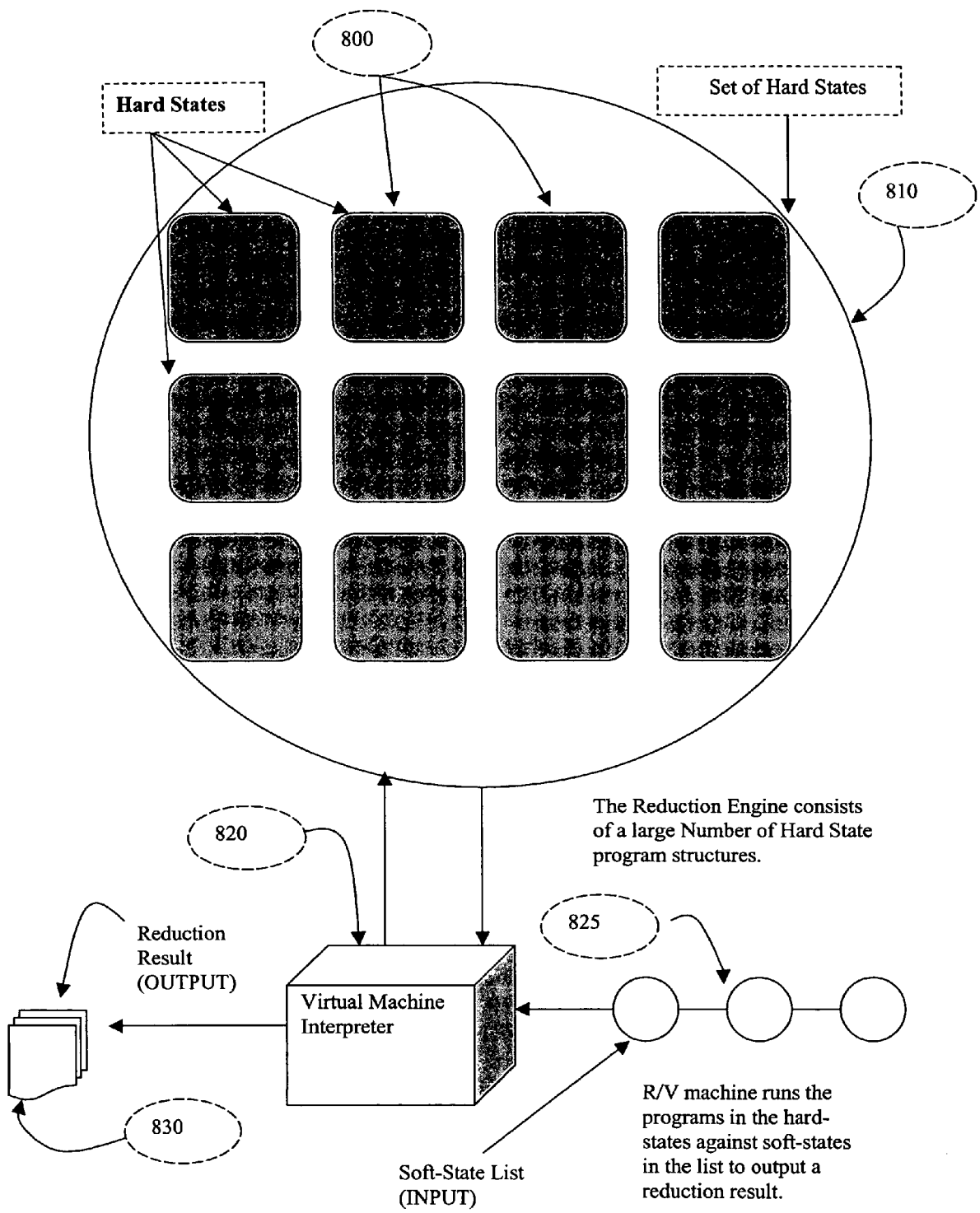
Fig. 8 – Reduction Process Diagram.

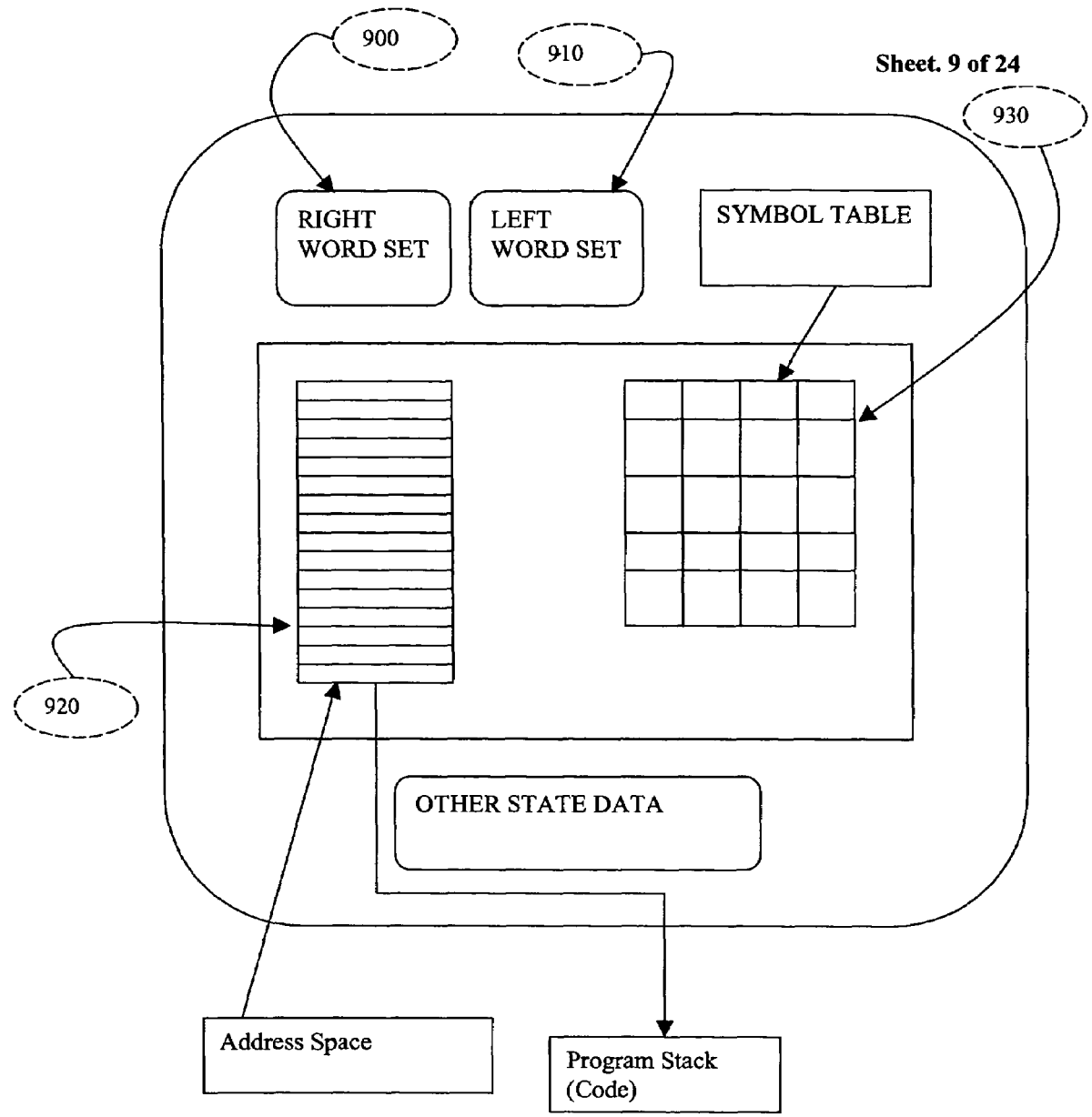
Fig. 9 – Diagram of a Hard State Structure.

Fig. 10 – Soft State Reduction Result List
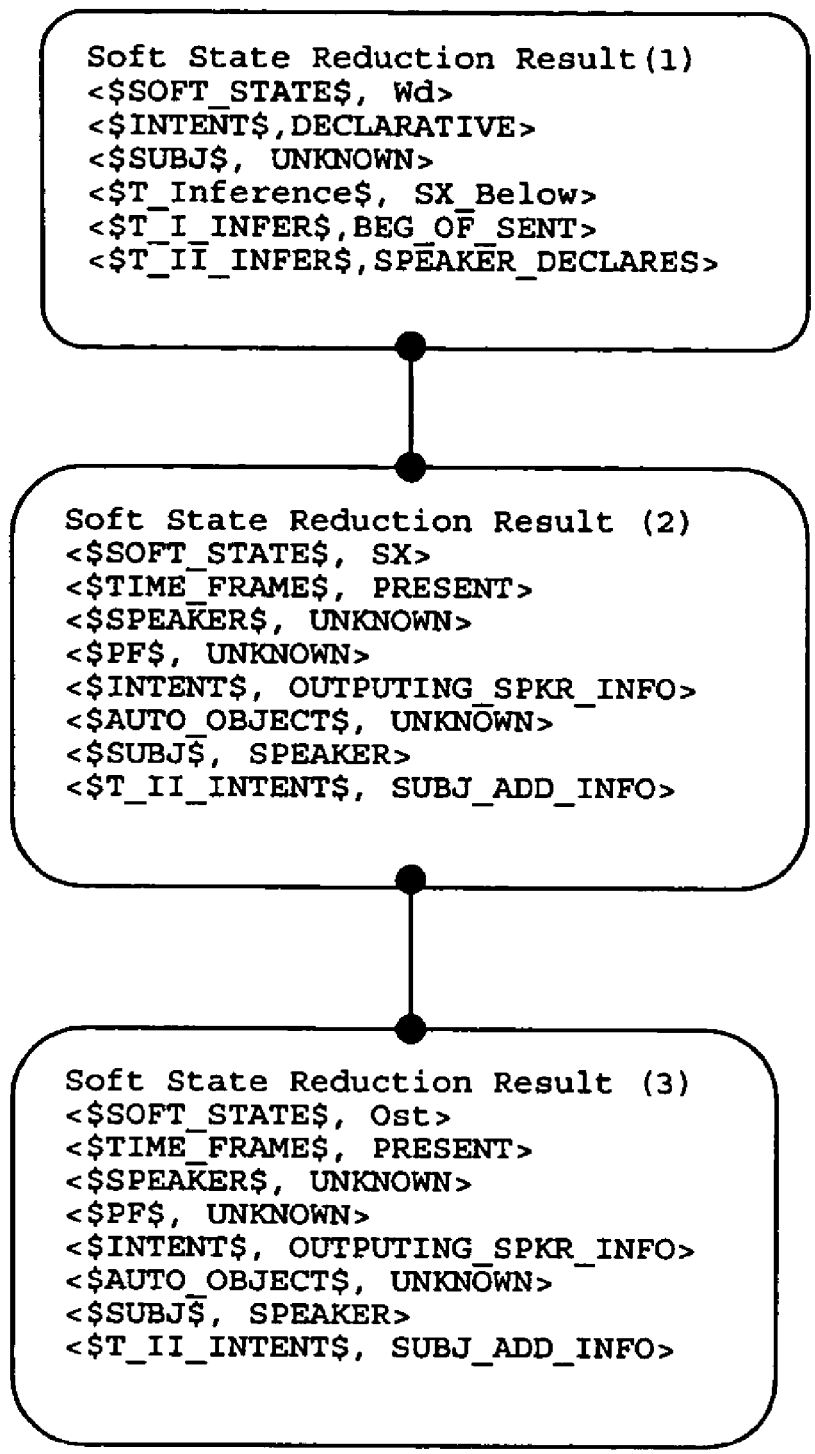

Fig. 11 – C-graph Search Algorithm
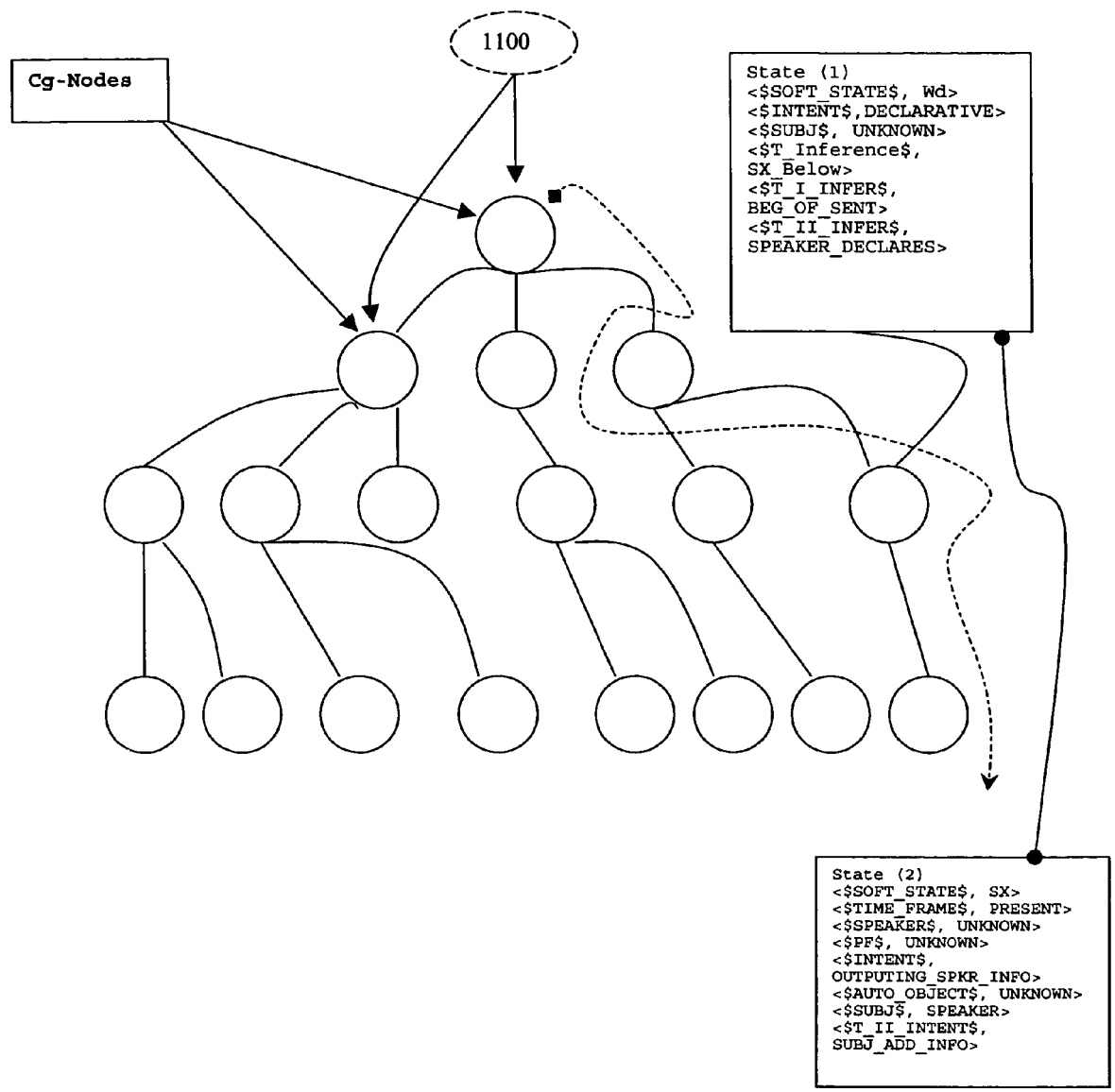

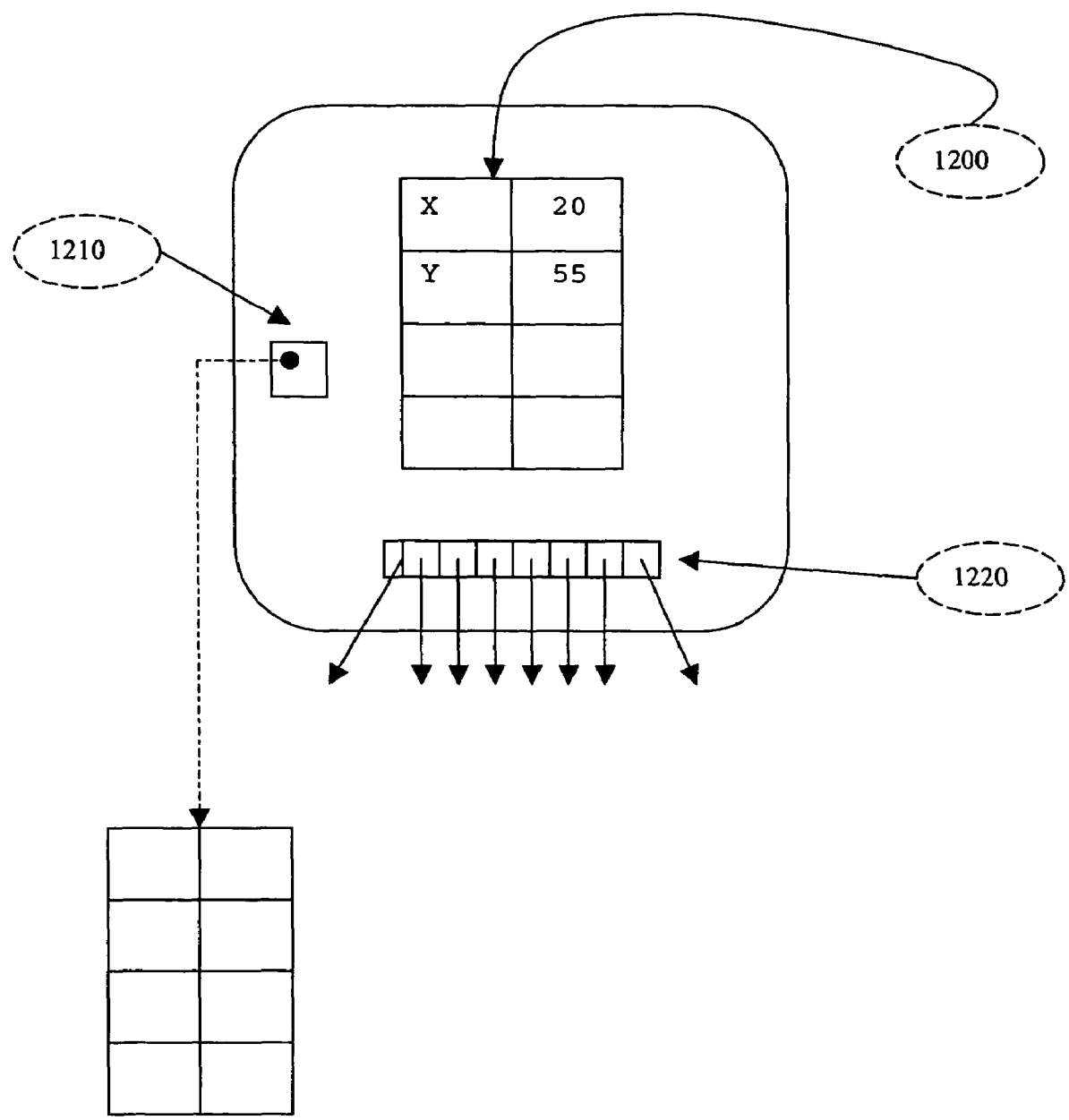
FIG. 12 - Structural Diagram of a Cg-Node

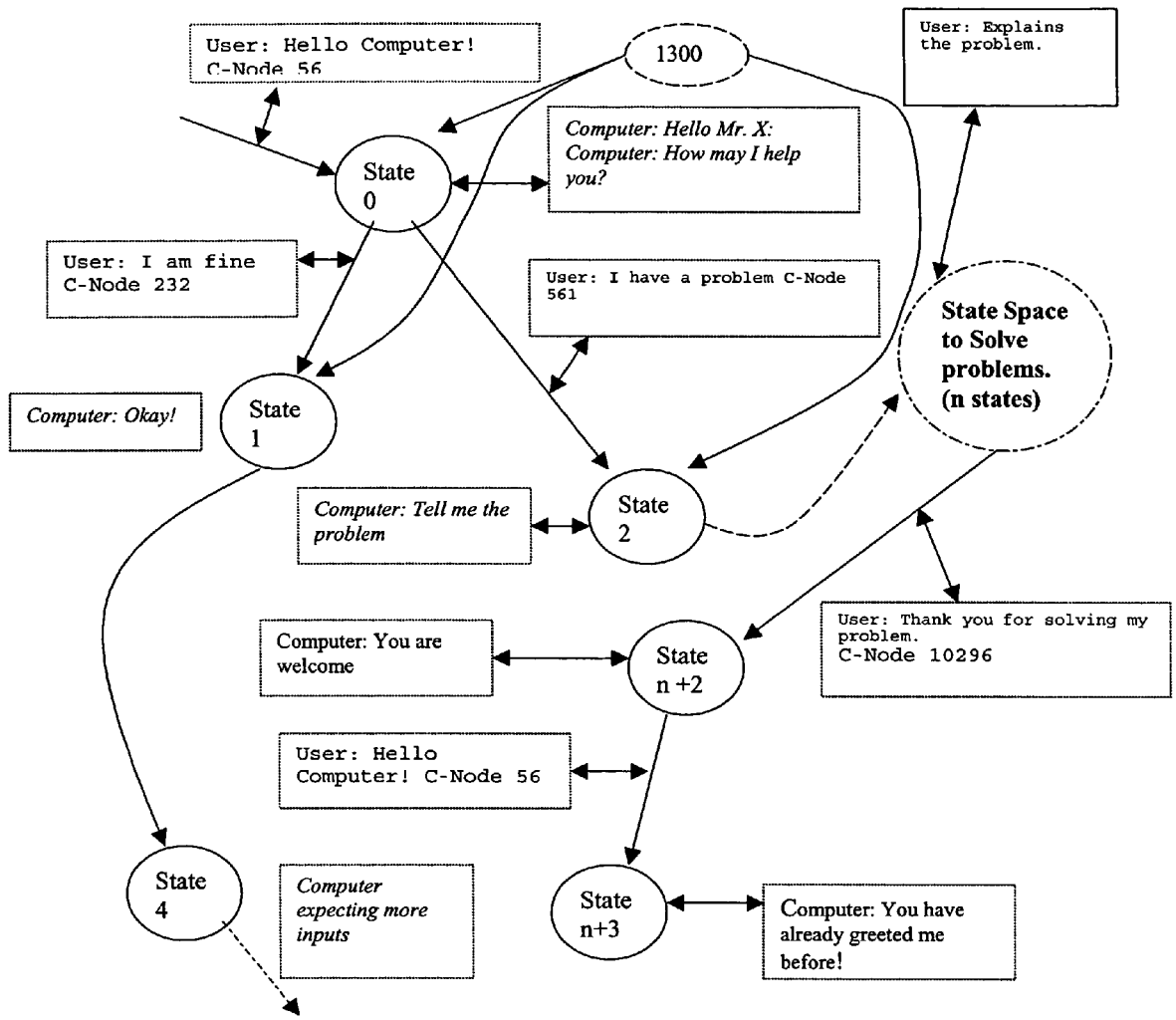
FIG. 13 - Stimulus State Graph Modeling a Conversation Using Stimulus Context Resolution Engine

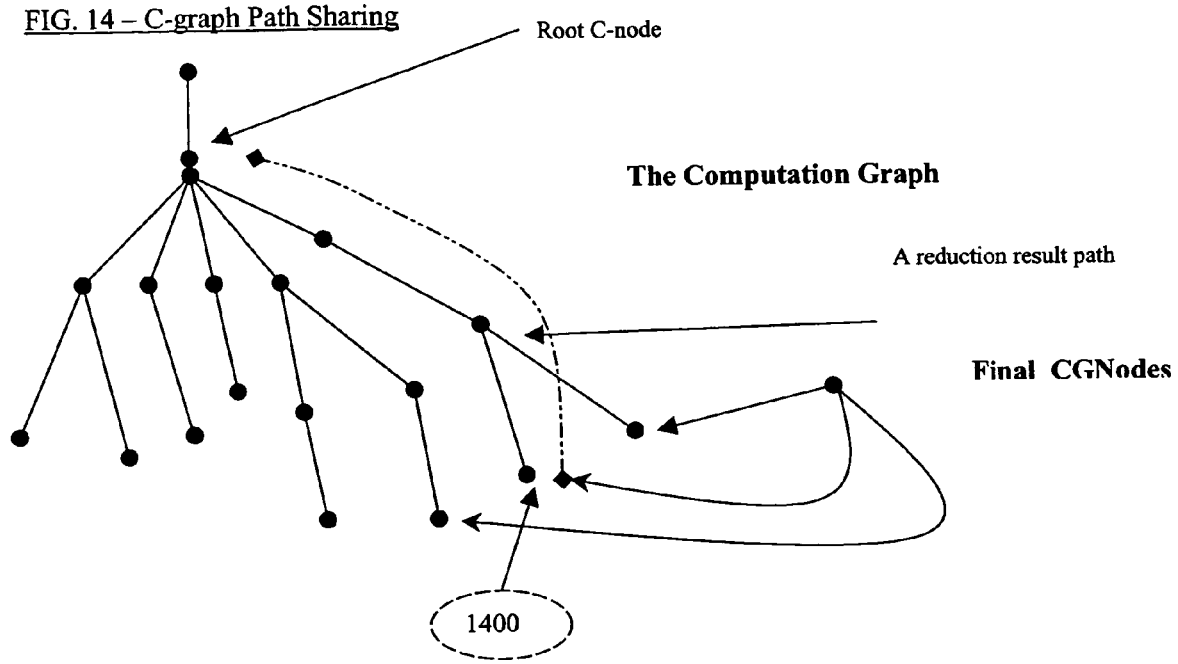
FIG. 14 – C-graph Path Sharing

FIG. 15 – A State Transition Table.

| Current State | Next State |
|---|---|
| 0 | 23 |
| 23 | 20 |
| 3 | 69 |
| 41 | 10 |

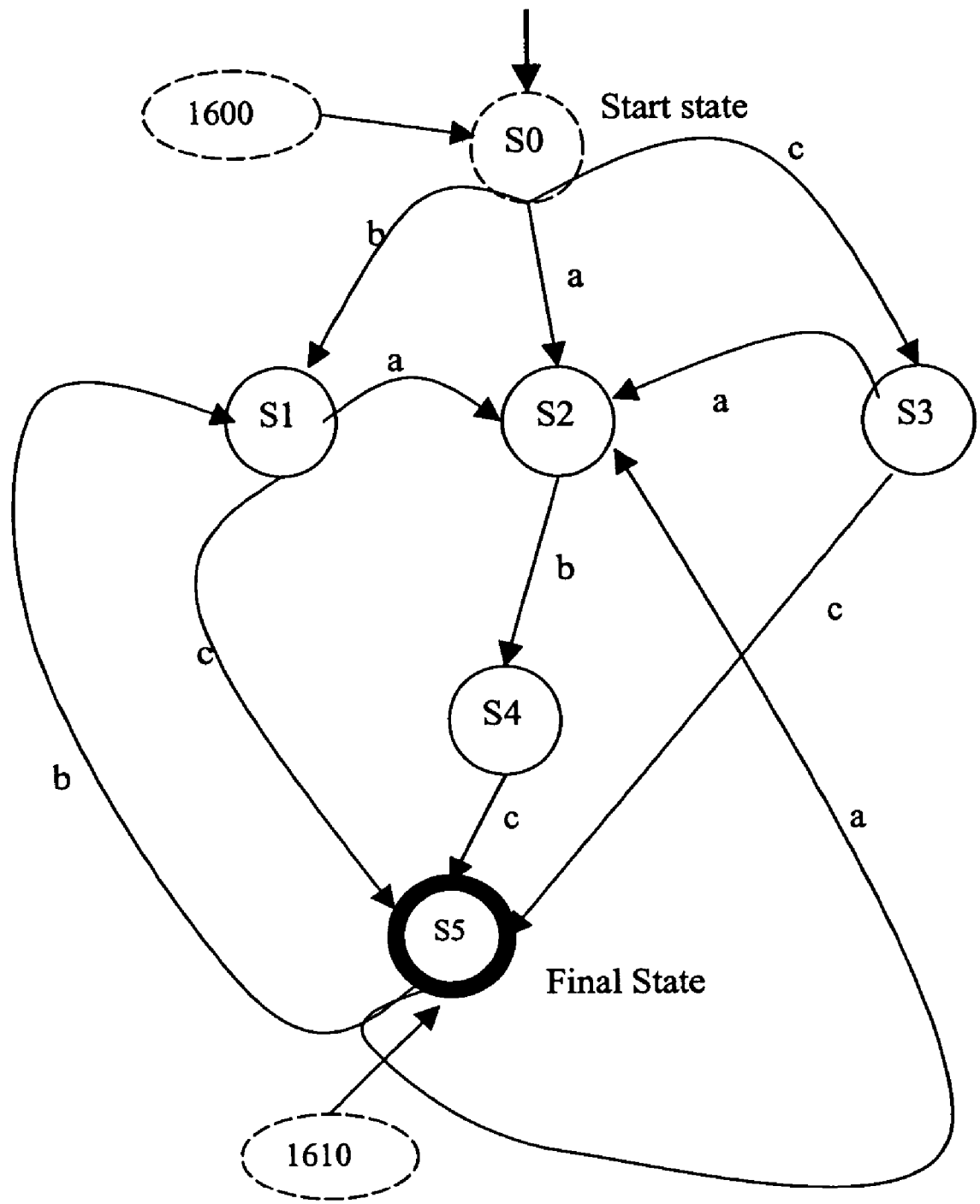
FIG. 16 – A Finite State Machine.

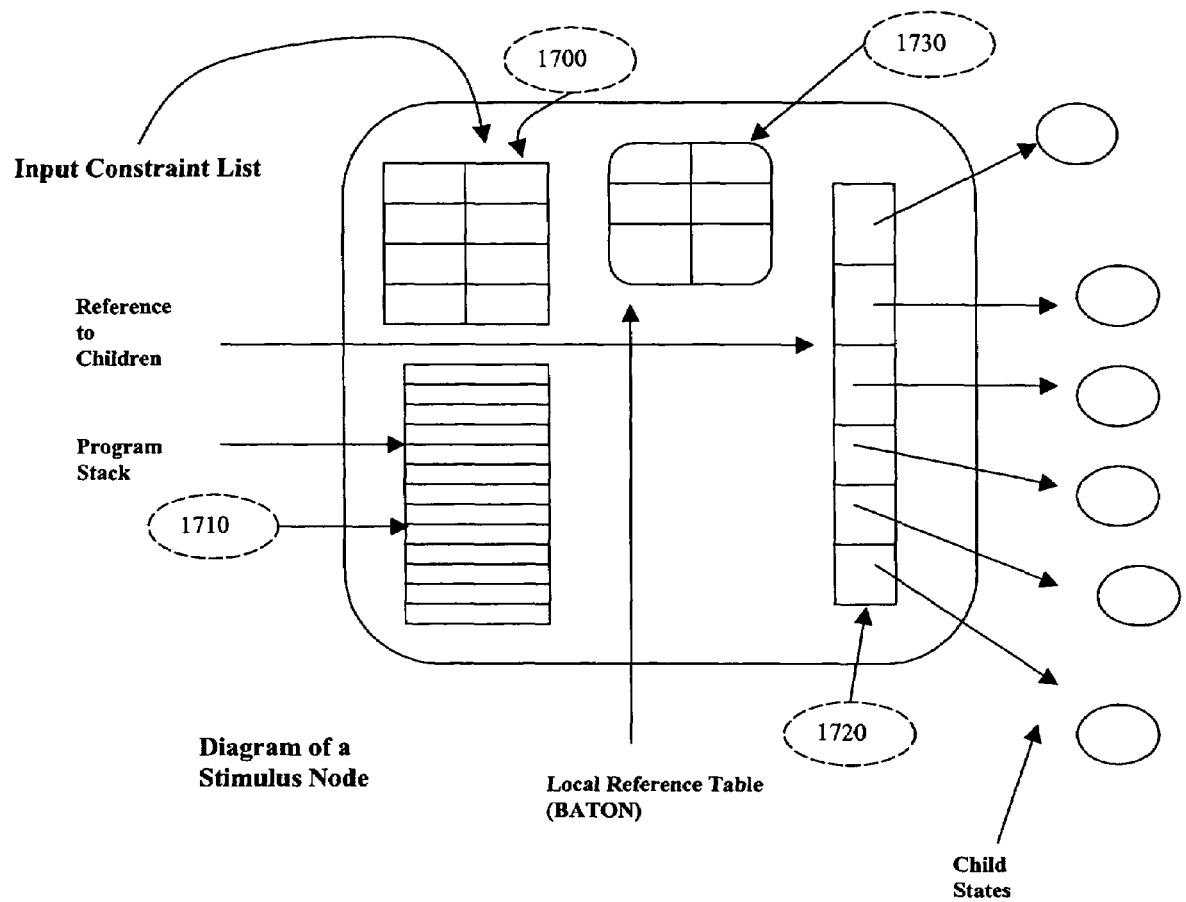
FIG. 17 – A Stimulus State/Node

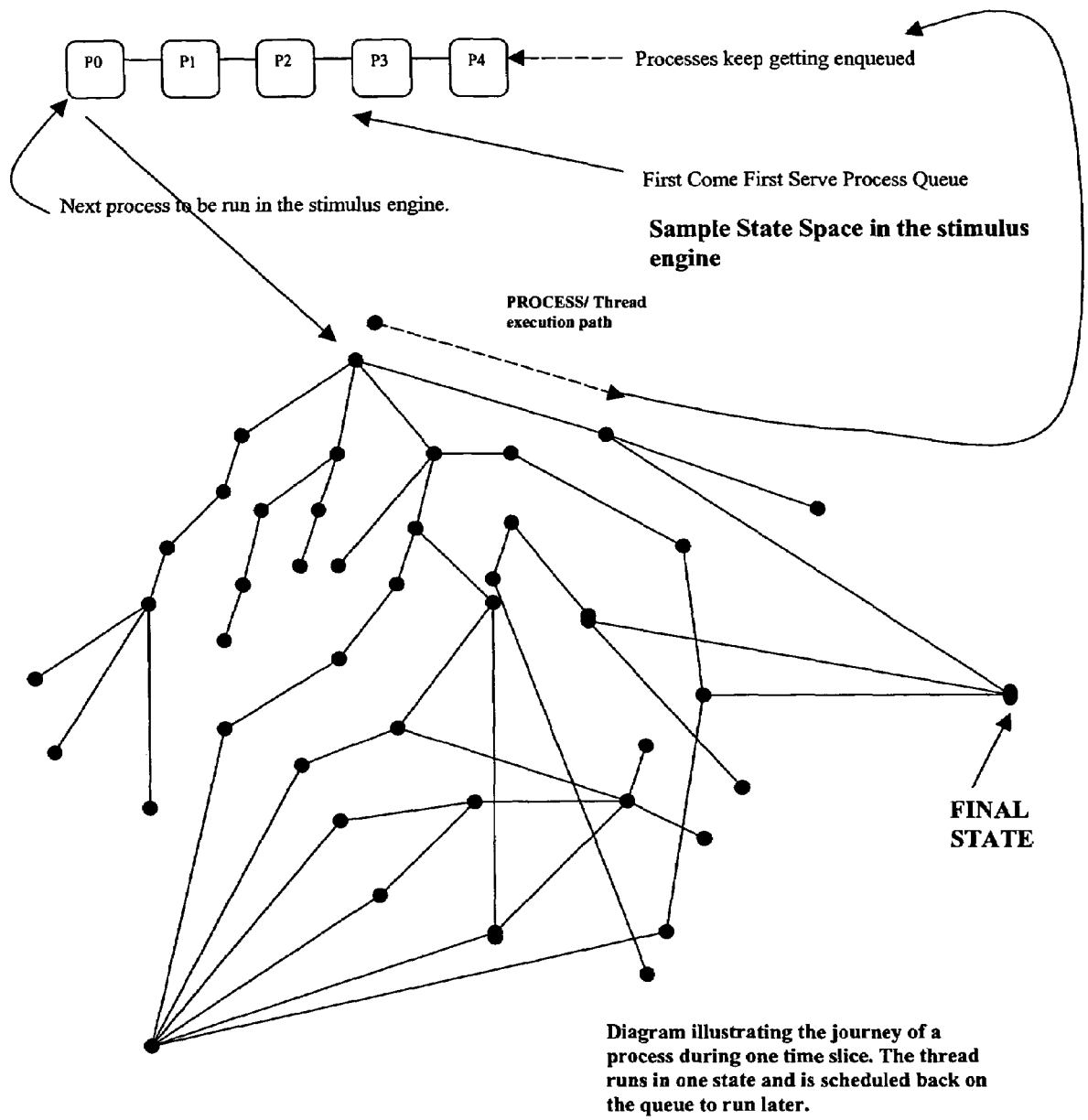
FIG. 18 Multithreaded Process Scheduling based On the Level-Order Traversal Tree Search Algorithm

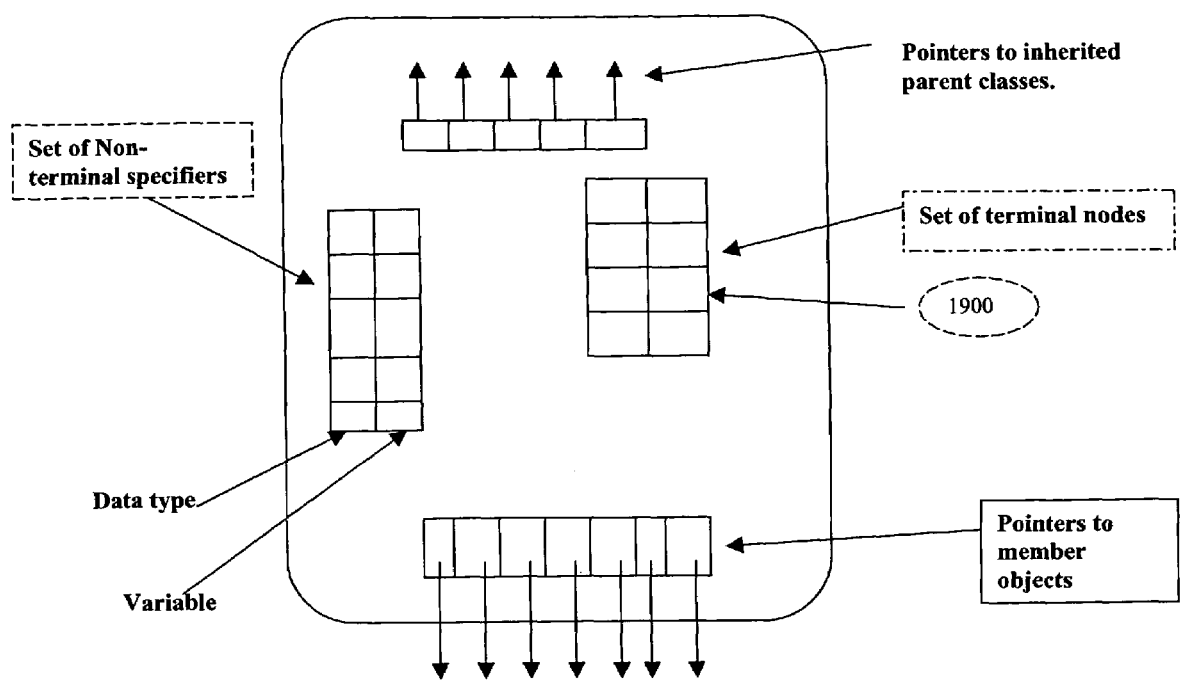
Fig. 19 – A Class Template Specification

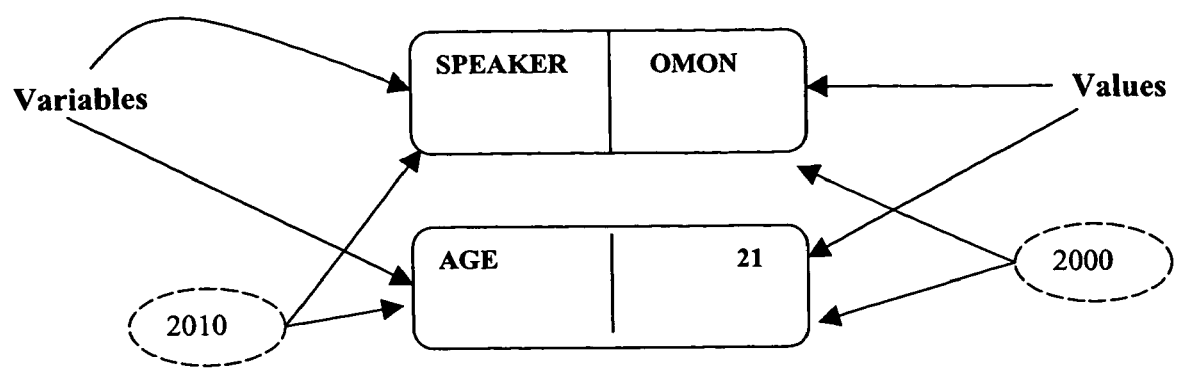
Fig. 20 -A Terminal Structure

Fig. 21: 2-LEVEL DEPTH OBJECT REALIZATION
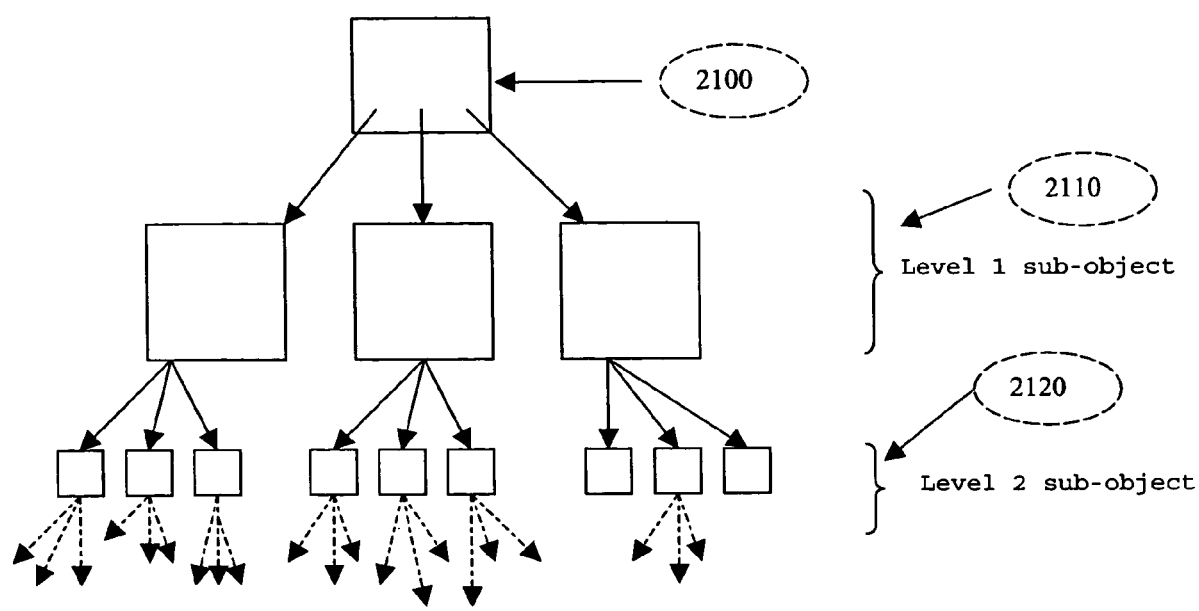

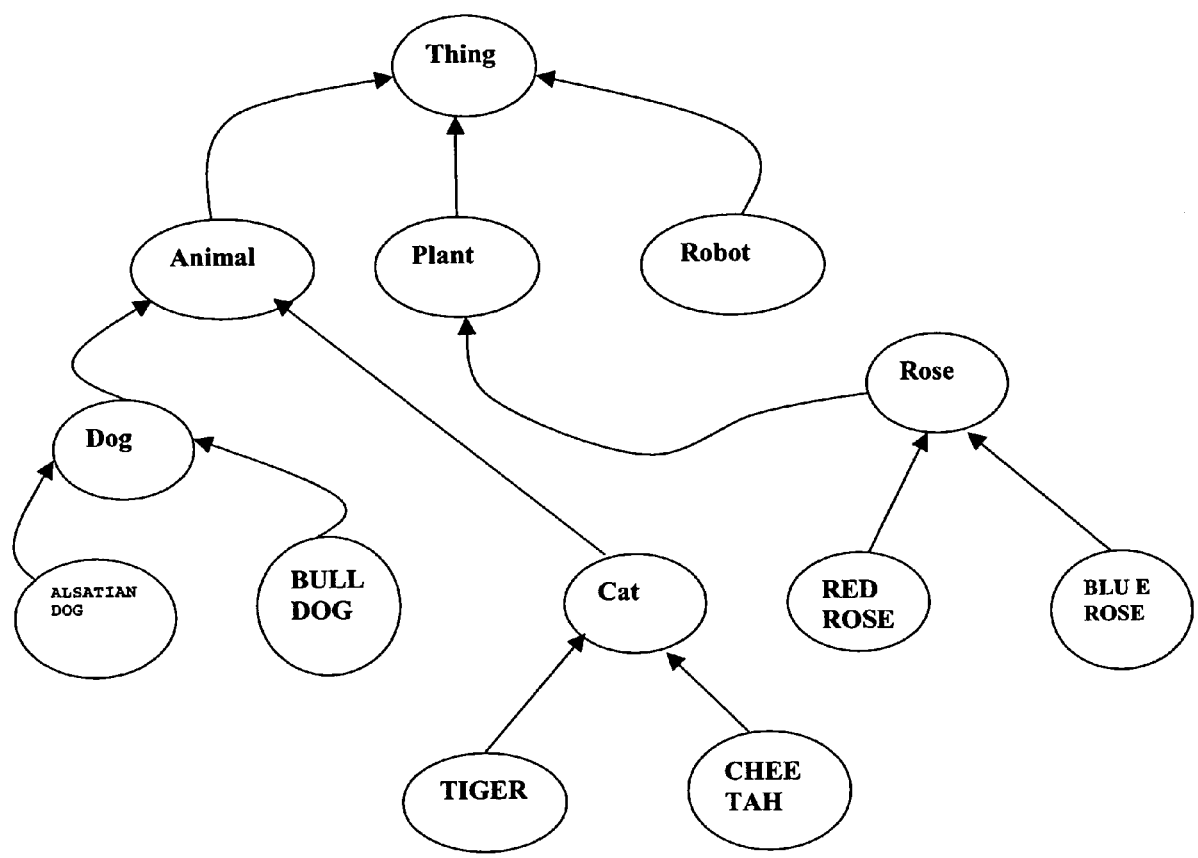
Fig. 22: AN INHERITANCE BASED CLASSIFICATION SYSTEM

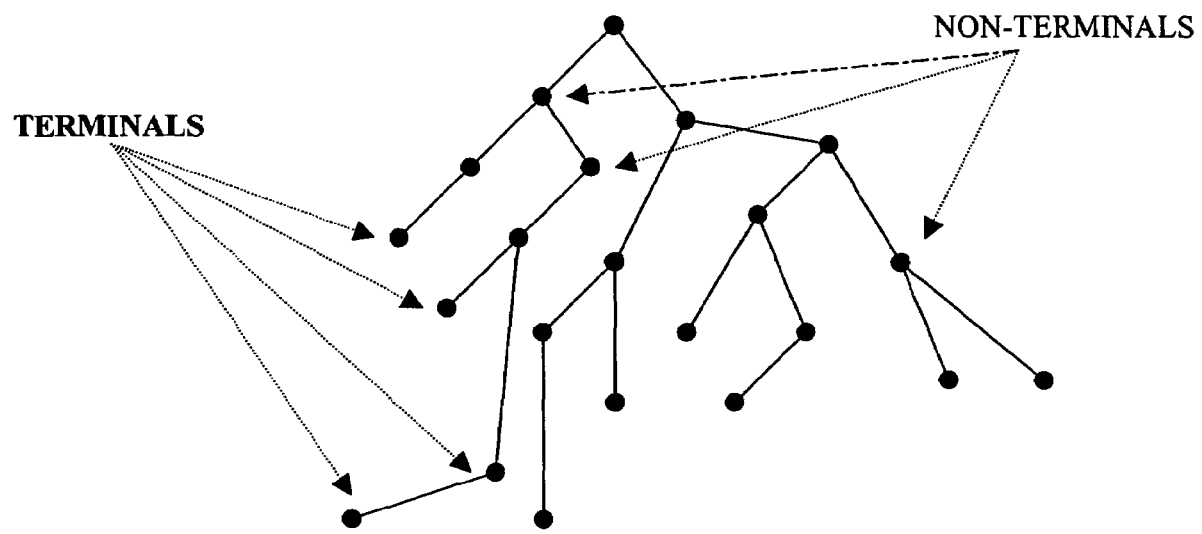
FIG.23: NON-TERMINAL OBJECT INSTANTIATION.

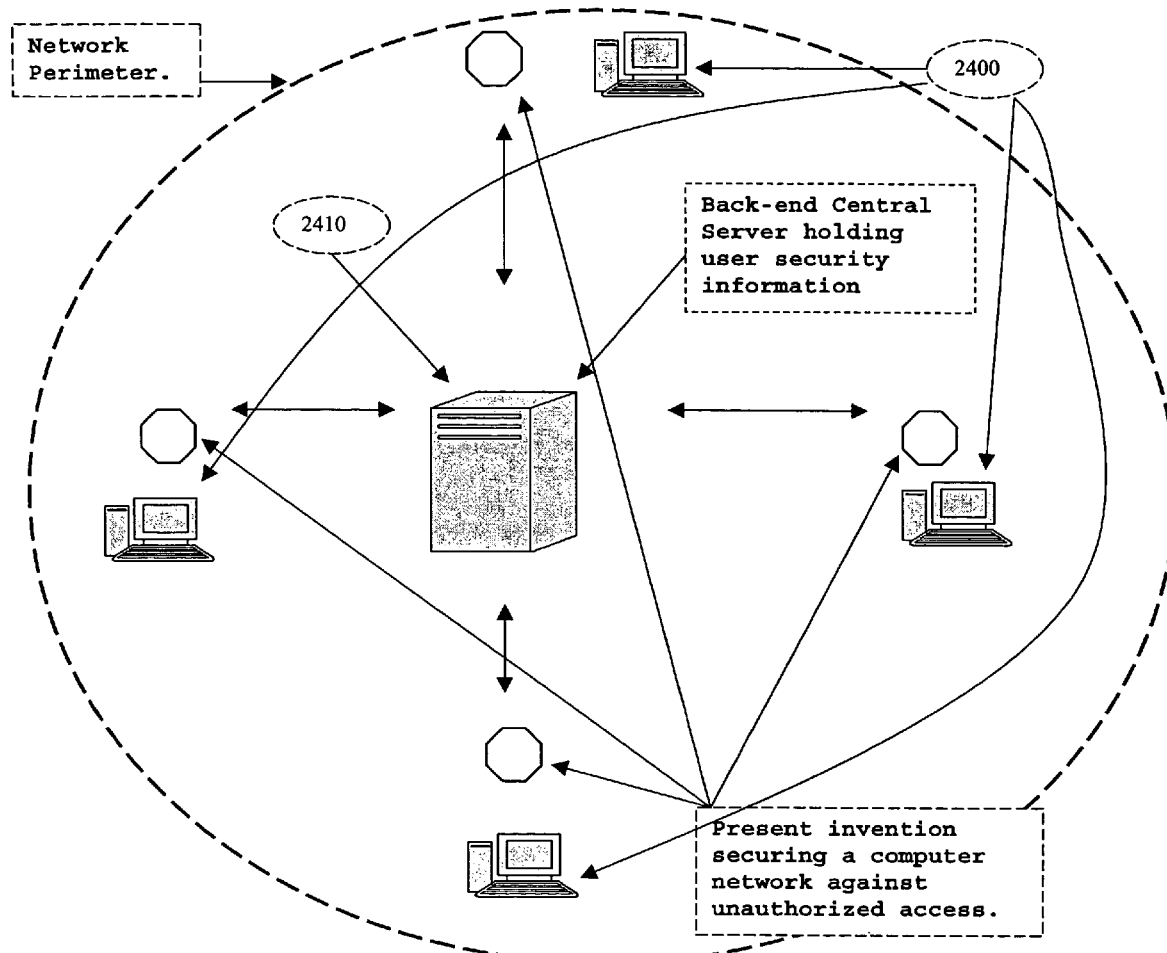
Fig. 24 Showing the Present Invention Securing A Network Of Computer Systems

SYSTEM AND METHOD FOR SECURING COMPUTER SYSTEM AGAINST UNAUTHORIZED ACCESS

This application claims priority to Provisional Patent Application No. 60/489,462 filed on Jul. 23, 2003.

BACKGROUND

1. Field of the Present Invention

The present invention relates generally to automated computer systems used to monitor and detect against unauthorized use of a computer network or system and more particularly to a system and method for securing computers against unauthorized use and access.

2. History of Related Art

In today's world, most businesses, government agencies and organizations depend on computer systems to communicate, transfer classified and unclassified information, and carry out various security-sensitive transactions such as executing financial payments using credit cards. It is estimated that nearly 70% of an organization's value is stored inside computer systems. This makes computer systems a prime target for thieves who might wish to steal this important information. It is important to secure computers against such information theft.

Firstly, one method by which thieves try to steal information is through the use of stolen user identities, often called computer identity-theft. Due to security concerns, computer systems were designed to grant access to trusted persons and deny access to those who are not authorized. This is carried out by the use of authentication systems which requires that a user first establish his/her legitimacy to use the computer system by first providing a user name and a password. Some other authentication systems require different access data such as smart cards and a personal identification number, biometrics, etc. However, in the real world, user identities (consisting of user names and passwords, smart cards etc.) are often stolen by thieves who later on use these user identities to log into the computer account of the person whose identity was stolen. In such cases the intruder will have full access to the computer account without being caught because the thief will be disguised using the identity of an authorized user. This is a serious problem because such security breaches never get detected since they appear legitimate. It is important that computer identity-theft attempts should be defeated.

Secondly, another means by which thieves steal information from computer systems is through insider espionage. This occurs when trusted computer users belonging to an organization such as employees or contractors (often called "insiders") choose to use their access rights for the wrong reasons. This problem is often called the "insider threat". Sometimes, employees may choose to use their access rights to steal company information with the objective of divulging it to unauthorized outsiders. It is important that such insider security breaches should be detected and thwarted.

Thirdly, computers are tools that have a tremendous amount of power and can do many things much faster and better than humans. Although computers have made life much easier for people, they can be a little bit difficult to use or communicate with. Computer software developers and engineers have developed several input devices, computer software systems and output devices to make it easier for people to use computers. However, sometimes it is still difficult to use computer systems because of their complexity. Therefore it is necessary to make it easier for people to communicate with computer systems.

In summary, computer security breaches caused as a result of identity-theft and insider espionage are very big problems facing the computer industry. Also, because computer systems are becoming more complex, it would be beneficial to allow humans to communicate with computers more easily. Accordingly, it would be beneficial to provide a computer system that can communicate easily with humans and also protect against identity theft and insider security breaches.

BRIEF SUMMARY OF THE INVENTION

The present invention has the ability to defeat computer security breaches caused as a result of computer identity-theft, and insider espionage by using a combination of artificial intelligence and continuous behavioral modeling. Also, the present invention includes a Programmable Artificial Intelligence Engine (PAIE) that can be programmed to communicate with human beings in human natural language. It has the ability to engage in an intelligent dialogue with human beings to the effect of solving a particular problem, depending on how the artificial intelligence engine was programmed. In the present invention, the PAIE is customized to help defeat computer security breaches. It was programmed to learn information about people through normal conversation so that the information can be used to verify the identity of persons who appear to be suspicious.

If a thief illegally gains access to a computer system by stealing someone's password, one thing is certain: he/she will behave in a manner that is suspicious—in a way that differs from how the legitimate user would behave under legitimate and normal circumstances. For example, such a perpetrator will probably log in at an odd time, use an application program at an odd time, work from a suspicious location, or they might choose to log in during the weekend so that they do not get caught. The present invention has the ability to identify such differences or anomalies in user behavior while working on a computer system. When the present invention identifies such suspicious behavior in a user's computer account, it determines whether the person logged in (currently labeled as a suspect) is actually the real owner of the computer account. It does this by interrogating the suspect by asking him/her questions based on what it knows about the legitimate owner of the computer account. If the suspect is able to answer the questions that the present invention asks, then that is proof that the suspect is legitimate, and access is restored to the computer account. However, the suspicious behavior is reported to security administrators by sending a report via email, and by logging a report to a central server. Since the person was behaving suspiciously, this might possibly be a case of insider-espionage, and therefore the incident might need to be investigated by the administrator. On the other hand, if the suspect fails the questioning, this is evidence that a security breach was caused by identity theft. This is because the suspect was found to be behaving suspiciously; furthermore, the suspect could not prove his/her identity by answering the questions asked by the present invention. Therefore, the present invention takes precautions by ejecting the suspect from the computer system and reporting the security breach to administrators detailing everything that happened. Unless administrators clear the security incident, the computer account will remain barred and further attempts to log into a computer system using that computer account will be denied by the present invention.

However, before the present invention interrogates suspects, it learns information about each legitimate user by conversing with them in human natural language using a PAIE. This PAIE learns information through normal dialogue. It asks questions and allows the user to share information with it using a free form of dialogue. In addition, the present invention learns how the legitimate user behaves over a course of time called the learning period, and creates a behavioral model for the legitimate user that consists of how the user behaved during the learning period. When this learning period expires, the present invention monitors the user's account watching for any behavior that appears suspicious—current behavior that is different from the behavioral model of the legitimate user that was built during the learning period. Whenever the present invention identifies such suspicious abnormal behavior, it interrogates the suspect as described above.

The PAIE has a software development platform that allows it to be customized for solving various problems as wanted by the application developer. The uses of this PAIE are many. It can be used to create applications that can serve as an intelligent interface to allow humans to interact with computer systems using the spoken natural language. In the present invention, the PAIE was customized for the computer security problem.

The present invention is related to two fields consisting of Computer Security and Artificial Intelligence. In the area of computer security, the present invention uses continuous behavioral modeling and artificial intelligence to secure a computer user's computer account against unauthorized access. The second aspect of the present invention is that of a PAIE that can be programmed to emulate human reasoning and natural language conversations between computer systems and people. The PAIE can (1.) understand human natural language, (2). be trained to understand human natural language, (3). learn various facts from a natural language conversation, (4). be programmed to make diverse inferences based on various facts learned. (5). be programmed to react to various situations in a pre-defined manner.

BRIEF DESCRIPTION OF THE DRAWINGS

Objects and advantages of the invention will become apparent upon reading the following detailed description and upon reference to the accompanying drawings in which:

FIG. 1 is a flow diagram illustrating the present invention and the steps that it takes to secure a computer users account against unauthorized access.

FIG. 2 illustrates the various components of the Programmable Artificial Intelligence Engine (PAIE).

FIG. 3 shows an example of an array of sentences representing a sequence of inputs generated by a user in a normal conversation.

FIG. 4 shows the Isolation Reduction Engine and the sequence of steps taken to carry out the reduction process on an input sentence.

FIG. 5 shows a graphical example of a Link Graph generated as output from the Link Grammar Parser.

FIG. 6 shows a graphical example of a Soft State List.

FIG. 7 shows a data representation of a Soft State List.

FIG. 8 shows the Reduction Process Diagram in Run Time mode.

FIG. 9 depicts a structural diagram of a Hard State structure.

FIG. 10 shows a Soft State Reduction Result List.

FIG. 11 shows C-graph and how reduction strips are found in the graph through path sharing search algorithm.

FIG. 12 depicts a structural diagram of a Cg-node structure.

FIG. 13 shows a graphic representation of how a Stimulus State Graph models a conversation.

FIG. 14 shows an illustration of Path Sharing in the C-graph.

FIG. 15 shows a State Transition Table. Control in the Stimulus Context Resolution Engine is guided by this table as inputs are received.

FIG. 16 is an example of a Finite State Machine used to recognize inputs.

FIG. 17 shows a Stimulus Node and its important parts.

FIG. 18 is an illustration of Multithreaded Process Scheduling of Threads Based on the Level-order Tree Traversal Search Algorithm.

FIG. 19 is a diagram of a Class Template Specification structure.

FIG. 20 is an illustration of Terminal Structure, also called an atomic node.

FIG. 21 is a description of the 2-Level Depth Object Realization strategy.

FIG. 22 shows the inheritance of classes in the autonomous knowledge base.

FIG. 23 illustrates the non-terminal object instantiation method.

FIG. 24 shows the present invention securing a network of computer systems.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the invention is limited only by the language of the appended claims.

DETAILED DESCRIPTION OF THE PRESENT INVENTION

The present invention secures a computer user's account against unauthorized access, by defeating two kinds of security breaches on computer systems, which are identity theft and insider espionage. Identity-theft occurs when thieves steal user identities such as passwords and then use it to illegally gain access to an authorized user's computer account. Insider espionage occurs when an "insider" belonging to an organization chooses to use his/her access privileges to steal information from the computer network of the organization. The present invention also contains a PAIE on which interactive applications can be developed to engage in intelligent interactions with humans.

FIG. 1 is a flow diagram illustrating the present invention and the steps that it takes to secure a computer users account against unauthorized access. The flow diagram depicts how the present invention works to secure each legitimate computer user. The present invention can secure several users concurrently inside a computer network. The present invention begins by learning personal information about the legitimate user by conversing with the user using human natural English language (block 100). This phase is called the Learning Session. In block 100, the present invention engages in a dialogue in which it talks with the user by asking him/her questions and receives answers to the questions that it asks. In the dialogue, the present invention also allows for a free form of dialogue in which the user can choose to tell the present invention whatever he/she wants to tell the present invention. The present invention understands what the user says, learns information about the user, and stores this information away in a knowledge base stored in a central server that holds security information for all user's being secured. The present invention uses its PAIE to carry out the dialogue with the user.

The present invention also learns how the user behaves while working on a computer (block 110) for a period of time called the Learning Period. The present invention uses its Behavioral Modeling Engine to learn how the user behaves. During the learning period the present invention monitors the user's activity, and it memorizes how the user behaves. The information about the user's behavior is also stored in the central server. When the present invention has finished learning how the user behaves, and it has completed learning personal information about the user, it begins monitoring the user's account for behavior that seems suspicious (block 120). The detection of suspicious behavior is significant because identity-thieves and persons trying to commit computer espionage typically exhibit suspicious behavior. Therefore, if the present invention ever sees the user behaving suspiciously— as defined by the behavioral modeling and anomaly detection algorithm (block 130)—then it labels the user a suspect, and informs administrators about the suspicious behavior in real time. Next, it interrogates the suspect by asking him/her questions based on what was learned about the user during the learning session (block 140). This phase (block 140) is called the Interrogation Session, and the present invention uses its artificial intelligence engine to ask the suspect questions using human natural language. If the suspect is able to pass the interrogation by answering the questions correctly in a prompt way (block 150), then access is granted to the suspect because the suspect has proven that he/she is authentic and not an impersonator. The present invention remodels the user's behavior for a short time in order to adapt to any additional behavioral aberrance, and it returns to monitoring the user's account in block 120. The result of the interrogation and the suspicious behavior is reported to security administrators for their investigation. On the other hand, if the suspect fails the interrogation by not answering correctly in a timely fashion (block 160), then that is proof that the suspect is an impersonator using a stolen identity. The present invention ejects the suspect from the computer system, and denies further access to that computer account. The present invention reports all details including the suspicious behavior seen and the result of the interrogation to security administrators for further investigation and possible prosecution. In block 170, security administrators receive the reports via email and on the central server, and then the person investigates the security breach using the security administration tool interface. When the administrator is finished, he/she can release the computer account so that access can be granted to the computer account, and the present invention returns to monitoring the user in block 120.

The present invention (FIG. 1) has 2 different components: (1). The PAIE (FIG. 2) which is responsible for learning information about a legitimate user (block 100) and carrying out interrogations on suspected security breaches (block 140), and (2). The Behavioral Modeling Engine which is responsible for learning how each legitimate user behaves over a period of time (block 110), and detects when the person logged in exhibits suspicious behavior that differs from the behavioral model of the legitimate user (block 130). The PAIE, an independent sub-component of the present invention, and its design, is described in more detail below, together with the Behavioral Modeling Engine, how it works to learn user behavior and detect anomalies.

FIG. 2 illustrates the various components of the PAIE. The PAIE (FIG. 2) was designed to understand spoken human natural language, and act upon it in a programmable way that can be customized by application developers. The PAIE consists of a series of 5 major sub-systems namely: (1). The Link Grammar Parser (block 210), (2). The Isolation Reduction Engine, (block 220) (3). The Computation Graph (block 230), (4). The Stimulus Context Resolution Engine (block. 240), and (5). The Autonomous Knowledge Base (block 250).

The PAIE is a sub-component of the present invention that was designed to carry out conversations and reason intelligently with human beings. It engages in a dialogue with a human user by exchanging sentences similar to how two people will engage in a conversation. It begins processing by receiving input sentences from the human user in text form (block 200), reasons about what the user is saying, and it can generate an output (block 270) or a reactive action (block 280). It operates by receiving inputs as English sentences, one at a time as a human user is issuing sentences in a conversation. Each input sentence is processed one at a time by passing the input sentence through the various components of the PAIE for processing. Generally speaking, it processes input sentences and generates either an output sentence (block 270) or a reactive action (block 280), depending on how it was programmed. FIG. 3 shows an example of an array of sentences representing a sequence of inputs generated by a user in a normal conversation. Each of the sentences (blocks 300, 310,320, 330) is passed into the PAIE one at a time for processing as they are being generated by the person conversing with the PAIE.

The PAIE, a sub-component of the present invention, has 2 distinct modes of operation. The first mode of operation is called Software Development Mode. In this mode, it can be programmed to behave in any manner that the application developer so chooses. In software development mode, the application developer uses the PAIE to generate a program that does what he/she wants it to do. The generated program can be saved and executed or run later by the PAIE in its second mode of operation called Run Time Mode. In run time mode, the PAIE executes a fully developed and tested artificial intelligence (AI) program that was developed during the software development phase. AI applications are developed using this PAIE in software development mode. Typically, when an AI application has been fully developed and tested, it is then executed inside the PAIE in run time mode.

In normal operational run-time mode, for natural language applications, the PAIE receives input sentences one at a time (block 200). It then understands each input sentence by performing computations as pre-programmed in the various sub-components of the PAIE. It then responds to the input (s) by executing a reaction (block 280), or generating a pre-programmed computation, which might evaluate to the execution of a function, or an output sentence (block 270). The Output Signal Processor (block 260) is a virtual method that can map to the desired output stream. In the present invention, it maps to the output function of the application which appears as text on the computer terminal. In other applications, this virtual method can map to speech synthesis systems or other output methods. The PAIE can also receive and process inputs other than a sequence of natural language inputs; however processing of the input will skip being passed through the Link Grammar Parser and go right into the Computation Search Graph (block 230). In describing the workings of the PAIE, the processing of each received input sentence is illustrated by passing it through the various sub-components of the PAIE in run time mode. In addition the software development phase is described.

FIG. 4 shows the Isolation Reduction Engine and the sequence of steps taken to carry out the reduction process on an input sentence. The Isolation Reduction Engine (block 220) is the first major sub-component of the PAIE. It is responsible for finding out the meaning of a sentence in isolation—that is, without taking into consideration the context in which the sentence was issued. The Isolation Reduction Engine is programmable in software development mode. In software development mode, it is programmed to generate inferences based on the desires of the application developer. When the application developer is done creating the reduction program, it is saved in a file, called the hard state file. In run time mode, the Isolation Reduction Engine loads and executes the reduction program saved in the hard state file, and generates reduction results for input sentences passed into it. FIG. 4 shows an illustration of the Isolation Reduction Engine.

The Isolation Reduction Engine begins by receiving an input sentence as a text string from a user either through the keyboard or from any other source (e.g. voice recognition system, file, network, etc.), and prepares it for processing (block 400). In block 400 the input sentence is received as a string of characters. Next, the input sentence is encased inside a sentence object. The important thing about 400 is that this input sentence is encased inside a sentence object, including the string representation of the sentence, which is encased inside the sentence object.

Next, the Isolation Reduction Engine runs the sentence through the Link Grammar Parser (block 410). The input sentence is sent through a Link Grammar Parser (LGP) to generate syntactic structures. Link Grammar Parsers are well known in the current art of Computational Linguistics. The Link Grammar Parser used in the present invention is a public domain parser available at a Carnegie Mellon University Website. When the input sentence in passed into the Link Grammar Parser, it generates a "link graph" which is the result of parsing the input sentence according to the link grammar rules as defined in the grammar files which are loaded into the link grammar parser. FIG. 5 shows a graphical example of a Link Graph generated as output from the Link Grammar Parser.

Next, the generated link graph of the input sentence is transferred over to the syntax extractor which extracts the linkage information using the API of the link grammar parser program, and builds a soft state list (method 420). The linkage information consists of all the links in the link graph. A link is defined as a connector, its corresponding left word and numeric index, and its corresponding right word and index. For each link extracted, a soft state structure is created. The soft state structure consists of the name of the connector, the left word, the left word index number, the right word, and the right word index number. Since link graphs for sentences typically consists of a series of links, a soft state structure for each link is generated and the resulting series of soft states are transformed into a list of soft states. For input sentences for which there exists no computable link graph the syntax extractor simply does not create a soft-state list. In this case, the sentence is sent directly into the C-graph (also called the Computation Search Engine) without reduction. FIG. 5 depicts a link graph generated by the link grammar parser for the sentence, "I am Omon." This graph is generated as the output from the Link Grammar Parser on passing the input sentence through the parser.

FIG. 6 shows a graphical example of a Soft State List. Next, the Isolation Reduction Engine converts the link graph generated (FIG. 5) to a list of connectors (structure 600) and their left (structure 610) and right (structure 620) children words as shown in FIG. 6. As shown in FIG. 6, each connector, its left and right children are called a Soft State. The resulting list of soft states is called a Soft State List, which is illustrated in FIG. 6. Internally, for implementation purposes, a link graph is stored as a sequence of links, in the order: @→(RW)→ (Wd)→(SX)→(Ost). A data-structure called a soft state structure is used to hold each link and its corresponding left and right words FIG. 7 shows a data representation of a Soft State List. In FIG. 7, each of the following data clusters enclosed by a brace is stored inside a soft state data structure. The sequence of links (soft-states) is referred to as a Soft State Graph or a Soft State List.

After a sentence has been passed into the parser and a soft state list has been generated from the syntax extractor method (method 420), then the soft state list is ready to be reduced to a Reduction Result. The Isolation Reduction Engine proceeds to check if the soft state list is reducable (method 430). Before advancing to what it means for a soft state to be reducable (method 430) lets give some background into the structural design and the operational modes of the Isolation Reduction Engine.

The Isolation Reduction Engine operates in two modes, which are software development mode, and run time mode. In software development mode, it can be programmed to fit the needs of the application developer. For example, this programming is done by inserting statements that reflect the meaning of the connector as described in the documentation of Link Grammar. These statements are inferences derived from the meaning of what a connector represents. With the aid of this disclosure, this procedure is apparent to those skilled in the art of isolation reduction programming. In run-time mode, the Isolation Reduction Engine can only execute the programs loaded into it.

FIG. 9 depicts a structural diagram of a Hard State structure. The Isolation Reduction Engine has a software development platform, which is used to process soft state lists in a dynamic and programmable manner in development mode only. The Isolation Reduction Engine uses of a set of programmable structures. These programmable structures are called Hard States (structure 800 and FIG. 9). A Hard State consists of the name of the hard state (the name of the connector(s) associated with it), a set of possible right words (structure 900), a set of possible left words (structure 910), a program stack holding the instructions for the hard state (structure 920), and a processor-symbol table for holding variables and data used during run-time execution (structure 930).

In software development mode, the Isolation Reduction Engine allows the application developer to write or modify hard state programs to suit his/her needs. In run-time mode, the Isolation Reduction Engine simply executes the hard-state programs for each soft state in the soft state list to generate inferences called reduction results. In run time mode, the ability to program the Isolation Reduction Engine is disabled. First, what happens to an input sentence when processed in software development mode is addressed. The input into the Isolation Reduction Engine is the Soft State List (FIG. 6 or FIG. 7). When an input sentence is received, it is sent into the Link Grammar Parser. The parser generates a link graph that is converted into a soft state list which is passed into the Isolation Reduction Engine for Reduction training (method 440) only if the soft state list cannot be completely reduced.

The reduction development algorithm is as follows: for each soft state in the soft state list, the Isolation Reduction Engine finds out whether the soft state is reducable (method 430). This amounts to searching for whether there exists a corresponding hard state program that has been defined for that particular soft state in the set of hard states (structure 810). For a soft state list to be reducable (method 430), each unique soft state in the soft state list is supposed to have at least one corresponding hard state program for it. If a soft state has never been defined—in other words it is not reducable (method 430's "NO" branch)—then the Isolation Reduction Engine has to "learn" about a new way to process this new soft state through dynamic reduction training or programming (method 440), which is developed and tested (method 445) by an application developer. In dynamic reduction training (methods 440 and 445), the reduction development engine will automatically guide the application developer in constructing a new hard state for that soft state. It will create the new hard state structure in memory, and it will allow the developer to write a program for that hard state. This new hard state will in most cases have the same name of the soft state that needs it. It is also possible for more than one soft state to use one hard state. The Isolation Reduction Engine will provide a software development environment to allow the application developer to program the hard-state to perform the necessary operations against the soft-state to generate the desired soft state reduction result. The software development environment allows the developer to enter basic programming instructions to suit his/her needs. Also it provides proper syntax analysis and semantic error checking to make sure that the program being developed is error free and in agreement with the Nova programming language. With the aid of this disclosure, programming the Isolation Reduction Engine can easily be accomplished by persons skilled in the art of reduction programming in the Nova programming language. When development is complete, the Isolation Reduction Engine allows the application developer to test the newly developed hard state program by executing the program as if it were in run time mode (method 445). Note that hard-state programming, modifying and interpretation are performed during run-time, and there is no traditional "compilation" of hard-state programs but rather it is dynamically analyzed and interpreted as the Isolation Reduction Engine is running.

Another aspect of dynamic reduction programming is the Nova programming language and the virtual interpreter. The PAIE including the Isolation Reduction Engine uses a prefix programming language created called Nova, that allows for the use of basic programming constructs such as addition, subtraction, string concatenation, function calling, if-statements, Boolean logic, operator assignment, etc. This language is interpreted inside the virtual interpreters of the various sub-components of the PAIE.

In method 440, the application developer constructs hard state programs using Nova for each new soft state and the task of the developer is to come up with a set of rules that defines the properties of each connector as wanted by the application developer. This amounts to writing instructions that reflect the desired meaning of the soft state in isolation. The application developer examines the meaning of the associated connector and writes programs that will generate inferences of the form X=Y based on certain conditions about the syntactic make up of the soft state. Also during this phase the developer gets to implement granularity levels that allow various degrees of inference to be generated based on the level of granularity (specificity of meaning). The program created by the application developer is verified to be error-free and can be tested using the software development environment. When the hard state program is executed by the virtual interpreter, based on the instructions inside each hard state, a list of inferences called a reduction result is generated for each soft state.

FIG. 8 shows the Reduction Process Diagram in Run Time mode. If a soft state is reducable (method 430's YES branch)—meaning that its corresponding hard state has been defined by the application developer and it exists in the hard state set (structure 810)—then there exists a hard state that has the same name of the current soft state. Since it has been defined, control is passed to its corresponding hard state that has the same name as the soft state. FIG. 10 shows a Soft State Reduction Result List. Next, the Isolation Reduction Engine uses its virtual machine interpreter (methods 450 and 820) to execute the hard state program instructions for that particular soft state to generate a set of inferences called a soft state reduction result (structure 830 and FIG. 10). Reductions are carried out for each soft state in the soft state list (structure 825). Also, each reduction result is a set of objects of the form X[R] Y, where [R] represents a semantic relation or <X, Y>∈[R], where [R] is a set of 2 unique objects related by some given property. During run time mode, the Isolation Reduction Engine executes the hard state programs and generates these reduction results for each soft state. If during run time mode, a soft state in the soft state list is found to not have a corresponding hard state, then an error message is returned by the Isolation Reduction Engine saying that the reduction attempt failed and that case is handled as an exception. If this happened in developer mode, the application programmer will be asked to train the Isolation Reduction Engine (method 440). The output is a list of <variable name, value> pairs generated by executing the instructions in the hard state programs called a soft state reduction result (structure 830). Next this reduction result is passed into the C-graph where the present invention begins the task of understanding the meaning of the sentence in context.

FIG. 11 shows C-graph and how reduction strips are found in the graph through path sharing search algorithm. Next, processing of the sentence arrives in the Computation Search Engine or C-graph (block 230, method 460, and FIG. 11). The soft state reduction result comes out from the Isolation Reduction Engine after reducing a soft state list. Next, the soft state reduction result is converted into a Computation Graph Node List (or Cgn-list). FIG. 12 depicts a structural diagram of a Cg-node structure. Each node in this list is called a Cg-node (structure 1100 and FIG. 12). Each Cg-node is equivalent to a soft state reduction, which turns out to consist of a vector of semantic pairs. A list of Cg-nodes is called a Cgn-list, similar to a soft state list. A Cg-node (FIG. 12) consists of an input-constraint/pre-condition list called a pair-list which is equal to some soft state reduction result (structure 1200), a node index, a pointer to a transition table (structure 1210), and paths or connections to other nodes which are stored in a children vector (structure 1220). The Cgn-list is sent to the C-graph search algorithm next. The C-graph is a search graph consisting of Cg-nodes that are connected together if there is a connection between any 2 Cg-nodes (FIG. 11).

Similar to the Isolation Reduction Engine, the C-graph operates in two modes namely the software development mode, and the run-time mode. During software development mode, the C-graph can be searched, and if searches prove to be unsuccessful, it can be extended automatically by the C-graph search algorithm. However, during run time mode, only searches are possible, and graph extensions or modifications are not permitted. The C-graph Search Algorithm (method 460) is as follows: when a Cgn-list is passed into the C-graph algorithm, it searches for a contiguous strip of the Cgn-list beginning from the root Cg-node of the C-graph as seen in FIG. 1. The algorithm will begin by setting a target pointer at the root Cg-node of the C-graph. Next it proceeds by comparing the first Cg-node in the Cgn-list against each of the pair lists of the children of the target Cg-Node until an equality is found between the contents of the Cg-node semantic pairs, and one of the target's children Cg-nodes pair list. If equality is found, the algorithm moves up to the second Cg-node in the Cgn-list and sets the target pointer to become the child node that had a match.

If having scanned all the target children nodes and no match is found, then the C-graph will be extended by adding the current Cg-node in the Cgn-list as a child of the target Cg-node in the C-graph. In run-time mode, the ability to extend the C-graph in this manner is disabled, and therefore an error message is returned saying that there exists no Cg-node for the soft state reduction result. The algorithm then continues the same process by searching for a match comparing the second Cg-node with the children of the new target Cg-node. The search algorithm continues in this manner until it gets to the last Cg-node of the Cgn-list and it will return the exact Cg-node in the C-graph that matches the last Cg-node. Once the match is found the last Cg-node in the C-graph is the output of the C-graph search algorithm. This last node is called the FINAL Cg-node (structure 470). This is a search algorithm that attempts to find a contiguous strip or path within the C-graph (e.g. the dotted lines in FIG. 11).

As the search algorithm runs through the Cgn-list, the C-graph is typically supposed to find a final Cg-node. However, in some cases, if during the search operation, the algorithm is in a given node, and there doesn't exist a path to follow on some given input node, then in that case, in software development mode, the C-graph takes the initiative to automatically build itself by extending the search path. The C-graph incrementally builds itself without human intervention by training itself more on how to allocate final nodes on new input patterns. The algorithm extends the graph by adding the soft state list to the C-graph. This is essentially how the C-graph is built from top to bottom.

Due to the fact that the C-graph is directly generated from the soft state reduction results generated from the Isolation Reduction Engine, it is necessary to ensure that changes to the hard state programs are properly reflected in the C-graph. Manual or automatic updating or modification of any hard-state program stack in the Isolation Reduction Engine can constitute a problem with regard to the transition matrices' referenced by the final node that is selected during a c-graph search. Input sentences with similar reduction patterns have the same transition tables associated with them. If a hard state program is changed then its reduction results generated from it will change too. This will affect all the paths in the C-graph involving that hard-state, thereby giving erroneous or ever-changing search-paths. In order to avoid this problem, training objects are used. A training object consists of the unique original input sentences that form a reduction pattern path (that represents all sentences that have that same reduction pattern), associated with a transition matrix/table. This way, in the event that a hard state changes, the transition table associated with each generic input sentence is maintained. By default, whenever a hard state is modified during the training phase, or the Isolation Reduction Engine is modified, the development platform automatically refreshes the entire C-graph to address problems that arise due to dependencies between the C-graph and the hard state programs. This operation involves destroying the C-graph and rebuilding it from scratch using its C-graph in order to maintain the C-graph's integrity. Application developers in software development mode use this function.

The C-graph component concludes the search process of identifying what a sentence means in isolation (block 470). It concludes the generalization of similar input patterns to one reduction strip, and maps these efficiently in the C-graph by representing the output as a final Cg-node. Also the C-graph efficiently organizes itself by a technique called Path Sharing (FIG. 11, and FIG. 14). Path sharing ensures that reduction strips that have partly identical contiguous parts (or sub-parts) are mapped to the same path in the C-graph. This is done to ensure that the C-graph is finite and efficiently used. Without path sharing, this becomes an infinite problem. Secondly the C-graph algorithm reduces the search time that would have been otherwise involved if it didn't exist by a large complexity factor. Given the c-graph, the search time will be O(log x N), as opposed to O(N). (Where x is the average number of children per node). The major advantage therefore is improved efficiency through path sharing. From the C-graph, control is passed on to the Stimulus Context Resolution Engine (block 240) where inputs are processed in context.

The ability to understand input sentences based on the context in which it is sent, and understanding inputs in the light of these different contexts is the heart of what the Stimulus Context Resolution Engine accomplishes. The Stimulus Context Resolution Engine models various contexts by using a derived finite state machine called the stimulus automaton. Its working principle is similar to a regular non-deterministic finite state machine. The stimulus automaton represents various contexts by keeping track of what state control is in. In other words different contexts are represented by different states in the stimulus automaton. Input sentences received are equivalent to the inputs received into a regular finite state machine. Depending on the input received at any given state, if there exists a possible next state for that input, then control is transferred to the next state. The idea here is that the same input can be modeled to mean different things depending on the state (context) in which the input was received. The Stimulus Context Resolution Engine runs a programmable stimulus state graph which needs to be developed by an application developer who creates the stimulus state programs and defines how inputs should be processed based on the current context. Development of the Stimulus Context Resolution Engine is done only during software development mode. During run-time mode, the Stimulus Context Resolution Engine receives inputs and processes them as defined by the stimulus finite state graph.

FIG. 13 shows a graphic representation of how a Stimulus State Graph models a conversation. The graph is loaded in run time and the Stimulus Context Resolution Engine controls the transitions from state to state as inputs arrive into the finite state machine. The input is the sentence, and the Cg-node contains the transition table for the input sentence. The transition table referenced by the Cg-node tells the Stimulus Context Resolution Engine where it should go from any current state. Generally speaking, the stimulus automaton is used to memorize established context built during a conversation. The stimulus automaton is used to remember what inputs have been received, up to a particular point. The current state represents the current context of the computation. In FIG. 11, control begins in state 0, where the user begins by greeting the computer. While conversing with the human user in run time mode, the stimulus automaton receives input sentences (block 200) through the Isolation Reduction Engine first; the Isolation Reduction Engine reduces the input sentence in isolation first and computes a reduction result (block 220).

FIG. 14 shows an illustration of Path Sharing in the C-graph. The reduction result is further prepared and made ready so that the C-graph can receive it. The C-graph receives the reduction result (reduced input), and identifies the path allocated for that input reduction result using its path sharing search technique (block 230). Having found the right path, the C-graph Search Algorithm needs to only extract the final Cg-node that the reduction result lands on. This final Cg-node represents the whole path because the C-graph is made up of paths that never intersect again after they branch from a common path. This computational ordering in the C-graph guarantees that a path can be identified using its final Cg-node because these paths never intersect more than once beginning from the root Cg-node (FIG. 14).

The final Cg-node that is extracted, in essence, represents the semantic interpretation of the input in "isolation" (structure 1400). Once the final Cg-node is extracted, it is important to now figure out how to know what that input/Cg-node means without excluding the context in which the input is received. In FIG. 13, the Stimulus Context Resolution Engine loads the state graph shown, and navigates control from state to state as the conversation proceeds. The user sends in an input, which is reduced to a Cg-node 56 (a greeting). The Stimulus Context Resolution Engine accounts for the context built up by following a transition table (n×2, where n is the total number of possible rows) embedded inside the final Cg-node that was selected i.e. C-Node 56.

FIG. 15 shows a State Transition Table. Control in the Stimulus Context Resolution Engine is guided by this table as inputs are received. To interpret what a transition function/table means the Stimulus Context Resolution Engine looks at what state that control resides in the stimulus automaton. After this it look for that state number under the "current state" column of the table for the final Cg-node. If it finds the current state, then the next state that control will go to on receiving the C-node will be the state number on the right hand side of the table. If it does not find the current state then the next transition remains undecided. In that case, if the Stimulus Context Resolution Engine is running in software development mode, the application developer takes on the task of extending the stimulus finite state graph to address that input in order to solve the problem posed by the given input. This graph extension is carried out in "developer mode" and consists of the training required to build a state graph. This involves creating a new state for that input in the state graph, and updating the transition table of the final Cg-node for the input.

The inputs are the Cg-nodes and the states represent the current context of the input stream being received. These transition functions are pre-defined and are programmed by the application Stimulus Context Resolution Engine developer. They help to build the Stimulus Context Resolution Engine continuously by determining what states inputs should go based on varying contexts. This is how context is modeled and resolved by the Stimulus Context Resolution Engine.

As seen in the example above, the states form a path, which effectively if preserved retains what has been received, and the ability to remember this information is what enables us to be able to keep track of what context has been built. The Stimulus Context Resolution Engine is be used to model natural language interactions, and several other types of logical computations involving context. The Stimulus Context Resolution Engine itself is a run-time execution platform that runs "programs" which are written to perform discreet tasks.

In order for the PAIE to be able to process inputs (including sentences) and solve the problems posed by these inputs, artificial intelligence programmers need to be able to build the stimulus state graph programs in such a manner that it can process inputs in a satisfactory manner. The Stimulus Context Resolution Engine provides a software development environment to allow programs to be developed. In addition to natural language processing capabilities, the Stimulus Context Resolution Engine was designed to perform advanced logic computations automatically by embedding instructions within states that instruct the Stimulus Context Resolution Engine on how to act under varying constraints. The programming language used within these states is the Nova programming language described earlier. For natural language processing software development, application developers spool in various inputs into the PAIE in software development mode, where it is reduced and a final Cg-node is allocated to the input. From here, the application software engineer drafts a plan of how the input should be processed if it is received given the current context (or state). Using the software development environment, this is modeled as a finite state graph diagram and this is built with the objective of reaching a final-state. The significance of reaching a final state is that the input problem/signal received is deemed "solved", and then control can trickle back to the hierarchical root state to receive more inputs (if so desired by the application developer). The Stimulus Context Resolution Engine development environment provides a software platform to create states, and write programs for those states. The above explanation is a summary of the process of natural language processing software development using the PAIE. With the aid of this disclosure, programming the Stimulus Context Resolution Engine can easily be accomplished by persons skilled in the art of Stimulus State programming in the Nova programming language. The run-time interpreted programming language named Nova is used to write programs that live inside the stimulus states. It is worthwhile investigating in a more detailed fashion the architecture of the Stimulus Context Resolution Engine.

The skeletal framework of the Stimulus Context Resolution Engine is a derivation of a non-deterministic finite state machine. A finite state machine consists of states connected with arcs as shown FIG. 14. The finite state machine has a start state from which control begins (structure 1600), and a final state where control ends (structure 1610). It is often the case that when control reaches a final state, a problem is deemed solved, or a pattern is deemed "recognized". Finite state machines are used for several different tasks including language recognition, mathematical computations, decision control modeling, switch and logic control, digital modeling of D-flip-flops and other state based electrical devices. The general feature that finite state machines provides to the application in which it is used is its ability to "remember" what actions have been taken or what inputs have been received. This allows the finite state machine to capture context or history of inputs.

FIG. 16 is an example of a Finite State Machine used to recognize inputs. The state graph shown in FIG. 16 solves the problem of recognizing sequences of characters. This works by starting at S0 (1600), and then from there when characters are received, all the arcs are examined to see whether the character received is equal to one of characters labeled on the arcs that branch from the current state. If an equality match is found, that means that control can progress to the state reached on following that arc. When control is in the next state, the next character from the input stream is fetched, and the inputs are continuously matched until the end of the input stream is reached. If at the end of the input stream the state machine arrives at a final state (marked by the thick black circle), then the problem has been solved, which in this case is the task of recognizing whether a sequence of characters has been received. The finite state graph above was designed to recognize the following 3 sequences bc, abc, cca. Given the following stream of input the finite state machine would get to the final states on the parenthesized letters: a a b b (c) a b (c) c c (a) ..d f d d f g t t t. Sometimes, when the state machine reaches a final state, it may output some character signifying that it has reached a final state. This is a general description of what finite state machines are used for. In circuitry they are used for signal recognition, and decision control. Bits of 0's and 1's are the letters of the binary alphabet, and to recognize sequences of messages finite state machines are used for recognition purposes.

In some natural language tasks, finite state machines are used for computing morphology formations in words. Morphemes are words that can be combined with additional strings to form new words: un+guard+ed+ly, over+critic+al, die+ing. Finite state machines are also used for other lexical and grammar recognition tasks. In the area of natural language processing, finite state machines are typically not used for anything else other than in these specific domains.

In the Stimulus Context Resolution Engine, a non-deterministic finite state machine is used to keep track of the state of context of the computation in question—which in this case is keeping track of verbal exchanges in a conversation. The skeletal state graph of the Stimulus Context Resolution Engine provides a framework in which one can know exactly where control is, and be able to predict what will happen based on the reception of different input signals. The Stimulus Context Resolution Engine development software has the ability to allow an application developer build a state graph to understand some inputs given various contexts. This development software allows a Nova programmer build a state graph on the fly that can solve a particular problem. The state graph is first constructed by hand, and then it is dynamically programmed into the Stimulus Context Resolution Engine by sending input signals (sentences) into the graph, and when inputs have been sent to states from which they are undefined, the application developer has the option of creating a new state, or set of states (called state spaces), that will address that input and carry it all the way to a final state (a solution). The Stimulus Context Resolution Engine has a development infrastructure that has the ability to dynamically build, test, and execute programmed stimulus states to the satisfaction of the developer. The Stimulus Context Resolution Engine can be used for a host of other tasks associated with modeling advanced logical decisions that involve contextual computations.

FIG. 17 shows a Stimulus State/Node and its important parts. A stimulus graph consists of a set of stimulus states/nodes, which are like the circles in the finite state diagrams above (structure 1300). These stimulus states can connect to other stimulus states. The stimulus states are the heart of the Stimulus Context Resolution Engine. A stimulus state can be a final or a non-final state. If a state is final and control enters that state, and execution finishes, then the problem being addressed by the current thread of execution has been solved, and that thread ends successfully. If a state is non-final, then when a process finishes executing in that state, the thread will look for a possible next state to transition to when scheduled next. In developer mode, if control reaches a non-final state, and there exists no possible next state to transition to next, then the application developer is asked by the software development platform to address this problem by extending the stimulus graph. This procedure involves adding more state programs that can successfully solve the input problem until the application developer reaches a final state. A stimulus state/node is shown in FIG. 17. Major constituents of a stimulus state include the Input Constraint Pair List (structure 1700), Program Stack (structure 1710), Reference Vector to Child States (structure 1720), and the Local Reference table (structure 1730).

The input constraint pair list (1700) is used to publish to all processes what conditions must be met before control can be passed into the state. There are 4 different kinds of input constraints: equality, subset, superset, and epsilon properties. These differ because the operations required when testing for satisfiability vary. Before a process transitions to another state, an impulse is tested against the input constraint to test for satisfiability.

The Program Stack (structure 1710) holds the various instructions that should be executed when control enters into this state. Each line holds a string, which is a Nova programming language statement. These statements are entered when a software developer is extending the stimulus graph to solve a given problem using the software development environment. There is no limit to the number of statements per state. There exists a vector of pointers to the possible next-states (structure 1720). In a state diagram, these pointers would act as the "arcs" connecting 2 states together. In the run-time algorithm to be discussed later, these references are examined when determining the next state to transfer control. The local reference table (structure 1730) is the most important structure in the stimulus node. It holds the current state data including local variables. The local reference table (1730) is also called the "baton", because one might imagine the different states passing local messages to one another if/when control is passed from one to the other. This closely resembles a relay race consisting of runners on a track. When a process is about to transition to another state, it transfers a copy of the local reference table from the old state to the next state.

The Stimulus Context Resolution Engine has some message passing mechanisms and broadcast methods used for inter-process communication. Sometimes, it is necessary for consecutive states in the execution path of a process to send messages to one another. This can be done by using the local reference table. The run-time algorithm of the stimulus context resolution engine enforces a default transfer of the local reference table from one state to the next state if a transition is possible. If a process wants to broadcast a message to all the other processes that are running, or that will be running in the future, the process broadcasts by writing messages to the global reference table. This global reference table is visible to all the processes running, and hence by doing this, messages can be broadcasted at will.

The Stimulus Context Resolution Engine allows application developers to build states that have embedded within them instructions that are executed or interpreted by the Stimulus Context Resolution Engine's run-time execution engine. The instructions embedded inside states are capable of performing computations similar to any other programming language. This includes logical decisions, mathematical computations, Boolean logic and general flow control constructs found in other general-purpose programming languages. The purpose of embedding instructions inside stimulus states was to give the application developer building stategraphs sufficient tools to solve discreet computational tasks. The practice of using programs embedded in a state graph reduces the programming burden by a large proportion because the very nature of state graphs embody context that if expanded will translate to millions of lines of regular code. Therefore in addition to this, the Stimulus Context Resolution Engine development infrastructure gives developers the ability to do the following: build state graphs from scratch; embed rules of logic into the state graph in order to solve tasks that the application requires; dynamically test the state graph by emulating the reception of input signals at various times and in various contexts; automatic handling of dependencies (if the state graph is used for natural language processing); testing alternative solution paths (In the non-deterministic case). The application developer engages in building "stage graphs" or "state spaces" that solve various problems including natural language processing problems, and advanced logic/reasoning-processing tasks. Next, the algorithm that guides how control is conducted in the Stimulus Context Resolution Engine during run time is addressed. The stimulus context resolution engine's run-time algorithm was designed to address some qualities discussed below.

Non-deterministic: This simply means that the Stimulus Context Resolution Engine can in "parallel" simulate the transition to more than one next state on the reception of one input—this amounts to emulating activity of more that one different thread of execution. This makes the Stimulus Context Resolution Engine multithreaded by nature. This allows the Stimulus Context Resolution Engine to engage in more than one activity at a time such as having the ability to converse with more than one person at a time.

Robust: During run-time it is possible that some input signals received are unprocessable for example if input cannot be reduced, or if it does not have a final Cg-node. This means that a particular <input_signal, context state> has never been received in the past, or it has been received but never processed by the developers. In this situation, during run-time the Stimulus Context Resolution Engine uses fault tolerance measures to address these kinds of unprocessed problems. The general way of solving this kind of problem is by using "exception states" which address faulty input signals that are unprocessable by the stimulus graph running in the Stimulus Context Resolution Engine. These exception states try to figure out what the input signal means, or sometimes the input signal is ignored, or modified, or repaired. These actions are strictly dependent on what the application developer intends to do with those unprocessable inputs at that given point in time. In natural language processing tasks, exceptions might try to resolve the meaning of input signal problems by trying to have the user re-word his input, or get the user to give input in a way that can be understood by the PAIE. Various techniques and strategies are used when doing exception handling. The key thing to remember is that they help in resolving input signal problems that have no solution in their crude form.

Fault-Tolerant: The Stimulus Context Resolution Engine run-time engine was designed also to be aware that in a world of imperfections, normally one should have back up plans in case things go wrong. The Stimulus Context Resolution Engine has a fault tolerance feature that allows it to address faults that happen due to late arrivals of expected inputs. This can pan out in several scenarios, however it is worth mentioning an example. In the PAIE, a sub-component of the present invention, there is a Nova function called hyper_input whose job is to receive and process input provided the input comes in within a time interval. If the input does not come in during the specified time interval, then the fault tolerance mechanism addresses this fault as an exception, by transferring control to a pre-programmed exception state that handles the fault so that less damage to the desired application is achieved.

Multithreaded: The internal core of the Stimulus Context Resolution Engine enables the engine to run several processes at the same time (seemingly). Because the engine can run more than one thread, it means it can be programmed to do more than one thing at a time, or the ability to speak, and reason with more than one person at once. These capabilities stem from the non-deterministic nature of the stimulus graph's run-time engine. It is important that the algorithm that allows for this multithreaded non-determinism be discussed;

FIG. 18 is an illustration of Multithreaded Process Scheduling of Threads Based on the Level-order Tree Traversal Search Algorithm. Multithreaded Process Scheduling based On the Level-Order Traversal Tree Search Algorithm: The Stimulus Context Resolution Engine consists of a set of connected stimulus states/nodes that form a forest or an acyclic graph. As mentioned earlier, these stimulus nodes/states have within them embedded programs that do the real "work" of computation following the desire of what the developer wants to achieve. The Stimulus Context Resolution Engine runs jobs, or tasks presented to it. Each task is similar to a "process" as understood in operating system terminology. A task is a finite, schedulable unit of computation possessing state/memory to keep track of certain variables. The algorithm begins by creating a thread which is made to run the through the ROOT state. From the ROOT State (synonymous to the Start State) the input signals are received, and the program-stack for the current state (set of embedded instructions) is executed for a time for a limit. After the minimum number of executed lines have been fired, then the memory of the process consisting of mainly local-process variables located in the local symbol table of the stimulus state are preserved within the process structure, and are placed on a queue scheduled to be run later. Once a program stack has finished executing, the algorithm computes the "stimulus impulse" of the Stimulus State consisting of the contents of the local symbol table of the current state. These mark the state of being of the computational process, and the run time engine uses this stimulus impulse to determine what state to transfer control to next. This process of determining the next state is done by examining each possible next state of the current Stimulus State. This involves examining all the child arcs connected to the current stimulus state, and then performing a decision making process that consists of seeing whether the computed stimulus impulse of the current state satisfies the input constraint of the possible next state. The input constraints are the conditions that determine whether control can be transferred into a stimulus state. If the constraint is satisfied, then the run time engine stores where that process will go to next as one of the variables in the process structure of the current process. If the on the other hand the constraint cannot be satisfied by the impulse of the requesting thread, then the algorithm proceeds to another possible next state. This goes on until all the possible next states have been tested for satisfiability, then the process structure is placed at the end of the queue and the next process on the queue is fetched. If there exists no next state to go to, then control is transferred to the Exception State associated with the current Control State.

Constraint Satisfiability: Constraints may be satisfied on the basis of the equality, subset, super set, or epsilon properties. Equality satisfiability means that before control can be passed to a stimulus node, the input constraints of that stimulus node must equal the stimulus impulse of the requesting thread. Subset satisfiability means that before control can be passed into a stimulus node, the input constraints of that stimulus node must be a subset the stimulus impulse of the requesting thread. The same idea applies to super set and epsilon means that any requesting thread can come into the stimulus node.

Non-Determinism and Concurrent Control: What if control can be passed to more than one next state? In other words what if more than 1 possible next state allows control into it? What happens in this case is that the process/thread "forks", generating other copies of itself; The number of copies that the process/thread generated is equal to the number of possible next-states that allow control to be passed into them from the current stimulus state. After these copies of the process have been created, they are scheduled to run in one of the possible next states at a later time, and they are enqueued in the process queue.

The Level Order Tree Traversal Search Algorithm (FIG. 18): The algorithm involves using a queue of independent processes consisting of enough state to hold information sufficient to know where (the stimulus stated identification number) the process would be run next, the starting line number, a copy of the local variable symbol table, and an input/output processing stream for that process. Every transaction/job is encased within a process structure as described above. Beginning from the root state, the process is run and placed back on the queue. It follows that the algorithm can be seen as a process of navigating through a search tree in a level-order manner. Each traversal down the tree may be seen as a finite unit of computation for each thread. Scheduling is done this way in order to be as fair as possible to all executing threads so that no one thread takes up all computational resources. This is similar to the concept of "dove-tailing". In this way, processes can be run in parallel in case non-deterministic transitions emerge (a case where there exists more than 1 possible next state).

Multitasking Capabilities: An interesting observation is that because of this design, the artificial intelligence engine would be able to converse/reason with more than one user at a time. Each user would begin initially; with one process, and then the various processes for each user will be time-shared according to the scheduler's judgment which in this case is the time taken to fire all the instructions in the program stack.

Signal Passing Schemes: In order to start the Stimulus Context Resolution Engine an input signal (for natural language interaction, a reduced input sentence) needs to be passed to it, beginning from a starting state (usually the ROOT State), and then execution follows from there and onwards till the final state is reached. It is compulsory that in normal run-time user mode, processing should reach a final state. In development mode this is not enforced in order to allow for developers to extend the stimulus state graph, and hence make improvements.

Dependency Conflicts: For natural language processing tasks, in some cases, state programs access reduction result variables in order to make further logical inferences and/or computations. Assuming that the reduction result variables remain fixed, there would be no problem. However sometimes in developer mode, a hard state might be deleted, or modified—sometimes affecting the reduction results generated. If some state programs access these deleted or modified reduction results, without being notified of the change, there exists the chance of trying to access some variable that does not even exist! This can cause some bewildering errors and un-expected program crashes. In order to solve this problem the Dependency Service Object keeps track of all the stimulus states that depend on the hard-states. If the Dependency Service object detect changes in the make up of the hard state programs, it performs searches to make sure that no stimulus state is affected. If a stimulus state is affected, then the change is rejected. The software module that addresses these problems is the Dependency Service. Maintaining the accuracy of these programs is what is referred to as "tightly coupling" the dependencies.

In summary, the Stimulus Context Resolution Engine consists of a software program that can load state graphs developed by application developers, and it can simulate the flow of threads in these loaded state graph as inputs drive the threads from one state to another in a non-deterministic sense.

The Autonomous Knowledge Base (block 250): In order for the present invention to learn information about people and things, it requires a database of some sort to be able to store and retrieve information. The Autonomous Knowledge Base accomplishes this data management task. API function calls to the AKB can be made from the state programs executing within the stimulus context resolution engine. The autonomous knowledge base is a major subsystem of the artificial intelligence engine, and it serves the other subsystems by providing a method of storing all kinds of data. The Isolation Reduction Engine, and the stimulus context resolution engine, can "talk" to the knowledge base by making run time function calls in the various program stacks to the knowledge base. Typical functional requests include reading, writing, searching and manipulating various knowledge structures. The purpose of the knowledge base is to provide a framework in which real world phenomena could be accurately represented and stored in a clear and organized form.

FIG. 19 is a diagram of a Class Template Specification structure. Set Based Data Classification: Real world objects can be classified using common set theory. A set is simply a collection of objects or units possessing a set of distinct properties that qualify its members to belong to that set. A set can also be seen as a class—for making classifications among objects. The autonomous knowledge base uses class definitions called Class Template Specifications (FIG. 19) to define or describe what properties that objects belonging to a particular set should possess. These class definitions are real data structures that hold a template of what members of the set should possess. The class definition is also called an autonomous class, or in short form "auto-class"; The units of the knowledge base are called "autonomous" because of the programming ideology behind the knowledge base's architecture. The various units are independent data structures that exist alone, and are connected to other data structure through index "pointers", or references.

Dynamic Class Template Specification Construction: To get a more practical understanding of class template specifications, let us see an example of how autonomous classes are used in the A.I engine. Let's say the artificial intelligence engine is learning about a class or a set, from a speaker, for example—the set of "humans"—the artificial intelligence engine can create an autonomous class definition called "human" during run time by making a call to the API function to create the class called "human". An application programmer can insert instructions by embedding inside a "learning" stimulus state some instructions to find out the general properties of members of any set, in this case, the set of humans. This kind of task can occur if one is building a state space that can learn various things about different classes. Such state spaces are called "class-construction" state spaces. The person conversing with the present invention may now give input to it, and the various subsystems process the input and finally the Stimulus Context Resolution Engine will have a means to extract from the reduction results the necessary data points. These data points can now be fed into the autonomous class under construction.

A Working Illustration: A class definition simply holds a template class specification of what properties that every object of that class should possess. An autonomous class structure is necessary so that the present invention can have a means of attributing some general properties to a named set. The autonomous class structure grants the set a set of properties that every object/real member of that set would possess. The artificial intelligence engine is a very dynamic system and it keeps getting fed new information about various things. This new information has to be classified and stored. The autonomous knowledge base must continuously and dynamically create data representations of information it receives, and infers. In order to make this clearer, let us use an example: assume that the present invention meets a new person for the $1^{st}$ time. Through natural language interaction, the present invention uses the various subsystems of its artificial intelligence engine (Isolation Reduction Engine, Stimulus Context Resolution Engine, etc), to figure out that it is conversing with a human being. Let's say the human has identified himself to be Jonathan. It is up to the artificial intelligence engine to create a data/knowledge representation of who Jonathan is, and store any new learned information that is specific to "Jonathan", so that the it doesn't forget this person that it has just met. In order to do this, it must create a unique separate knowledge representation of "Jonathan". This is where autonomous classes come into the picture. The knowledge base's engine will look for the class definition template/autonomous class structure called "human", and construct, and allocate a real "object" that has the properties spelled out in the class template specification for humans. The "object" is what would be manipulated or modified; the class simply provides the knowledge base a method of dynamically constructing objects.

The Autonomous Class Data Structure And Dynamic Object Construction: FIG. 19 depicts what a class template specification is made up of. The first item is called a terminal node (structure 1900). FIG. 20 is an illustration of Terminal Structure, also called an atomic node. A terminal node is a pair of symbols that contain data. A terminal is the most basic unit of data in the knowledge base. A terminal node is called "terminal", because it is a primitive structure—there exists no simpler data type in the knowledge base. The concept of the terminal node is used throughout the knowledge base. A terminal is used to model variables and their values. The first member of the pair is called the atomic name (structure 2010), and the second member of the pair is called the atomic value (structure 2000). The content of the terminal is purely symbolic, and may be interpreted as wished, as well as cross-converted to other data types. Typically they can hold integers, characters, strings, and Boolean types. As seen in FIG. 20, terminals store any kind of pair of symbolic data. Terminals model knowledge relationships that can be reduced to "X=Y" relations; More generally X<operator>Y type relations, also commonly known as "binary relations". Examples are: Charlie's girlfriend=Joanna, Amount Invested=200, 200>10, 10<=10. In the artificial intelligence engine one technique is to reduce information to binary variables such as these and store them as terminal nodes inside the knowledge base. Therefore looking at the big picture, when the knowledge base's engine constructs a "real" member object following this class specification, the member object should contain its own separate copies of these terminals.

Non-Terminal Specifiers: It is possible for an object to have contained within itself another object. For example a human object (a person) has contained within him an instance of a human heart, and billions of cells, body parts, etc—all different object instances contained inside a human object. These instances themselves are objects and therefore belong to a particular set/class. Non-terminal specifiers are used to model these kinds of relationships—"objects embedded inside objects". Non-terminal specifiers simply describe the object by telling the knowledge base construction engine exactly what types of objects are contained inside instances of the class, and a referential name is assigned to it. In other words the non-terminal specifier is no more than the unique class identification, paired with a variable name. That tells the run-time object constructor what type of object to create, and what to call it.

FIG. 21 is a description of the 2-Level Depth Object Realization strategy. Objects with sub-objects within them only realize sub-objects that are 2 levels deep. Cyclical Class Specification Definitions: When constructing objects it is possible for a class to have an instance of itself embedded inside of it. Also it is possible for a class A to have contained inside of it a class B, and only for class B to have contained inside of it an instance of Class A. These sorts of cyclical relationships are called duplicity (in the case of two), and transitivity (in the case of more than two) cross-relationships. If the object construction method naively creates objects without taking this relationship into proper account, the runtime object construction system of the knowledge base would eventually run out of computational resources (memory), because it would infinitely be creating objects contained inside objects. This is why the implementation of this phenomenon is partial. In all cases when constructing objects, the object construction engine constructs objects that goes no more than 2 levels deep (FIG. 21). It then leaves the rest of the construction as "virtualized pointers". Only when these objects are referenced, then they actually come into being. This is an important relationship to model because it is possible to have phenomena, which follow such arrangements. In FIG. 21, structure 2100 sub-objects that are 2 levels deep remained undefined until referenced.

FIG. 22 shows the inheritance of classes in the autonomous knowledge base. Class Hierarchy and Inheritance: In the knowledge base, it is possible for one class to inherit from several "parent" classes. By establishing such relationships, a class specification can make itself a subset of its parent. This means that every member object of the set represented by the class specification, is also a member of all the parents of the class specification. The purpose of including the inheritance feature into the knowledge base is because many phenomena in the real world exhibit such relational characteristics. One set of objects might belong to another set and so on and so forth. FIG. 22 illustrates this aspect of the knowledge base.

FIG. 23 illustrates the non-terminal object instantiation method. Inheritance Object Construction Algorithm: Since sets exhibit inheritance relationships between one another, it is necessary to model objects belonging to these relationships computationally. This is accomplished by keeping reference pointers to the parent classes of a class template specification. When the runtime object construction function of the knowledge base is creating objects of a class that has parents, it recursively builds the object by making sure that the created object contains all the properties of all its parents, in a non-repetitive manner. The algorithm that does this uses a queue and recursively climbs up the parent hierarchies collecting all the properties and creating "real" instances (terminals and non-terminals) to arrive at an object. An autonomous non-terminal object is a realization of a class template specification. It is possible for an object to be a member of several classes, and hence inherit the attributes of all the classes. A non-terminal object is very similar to the class specification except that it contains "real" instances. Since non-terminals can have terminals contained inside of them, as well as instances of other non-terminals, the resulting picture of a non-terminal object resembles a tree as see in FIG. 23.

Communication between Knowledge Base and Other Sub-Systems: Class specifications are used to store information about properties of sets. The present invention's PAIE can dynamically build a class and various objects while engaging in a conversation with a user. Artificial intelligence developers write code that can effectively and correctly learn about a class dynamically during run time. As soon as class is created, there are function calls available to create a non-terminal object that is a realization of the class that was described to it. In addition to this, several dependencies surface due to the fact that the operation of the knowledge base is very dynamic, and the various knowledge structures tend to be interdependent. For instance if a user changes some information about a class specification, that means that all the members that belong to the set characterized by the class specification need to be updated. Such dependencies are addressed by the autonomous knowledge base methods. In general, terminals are used to model all kinds of relations. Non-terminals are used to model N-ary relations that are composed of several clustered variables.

Application of PAIE to the Computer Security Problem: This PAIE was programmed to suit the computer security application. It was designed to engage in a learning session (block 100) during which it learns information about people by conversing with them using the state programs being executed inside the PAIE as described above. The necessary knowledge associated with each user is stored inside the knowledge base as terminal and non-terminal structures. This information is stored in the central server in encrypted form for each user being secured. Whenever the computer security software detects suspicious behavior in a user's computer account (block 120), the artificial intelligence engine is invoked, and it begins to question the suspect based on information learned during the learning session (block 140). If the suspect is able to answer correctly then he/she is allowed to continue accessing the computer system, otherwise if the suspect fails to answer the questions correctly, then the suspect is immediately ejected from the computer system. In order for the present invention to secure a user's computer account, it needs to be able to detect when the logged on user is behaving in a manner that is deemed suspicious—in an abnormal manner. Before the present invention can detect such abnormalities, it needs to know how the user behaves normally.

Behavioral Modeling and Anomaly Detection Using The Fixed Normal Probability Algorithm: The Fixed Normal Probability (FNP) algorithm is a method of modeling recurring behavioral patterns as an abstract computational representation. The Fixed Normal Probability Algorithm is also referred to as the Detection Engine. The FNP algorithm is being used in the computer security aspect of the present invention. FNP has the ability to learn how a user behaves over time (block 110), detect when a user is behaving differently from how he normally behaves (block 130), and to incorporate behavioral patterns that were not previously learned (block 150). Next, the Fixed Normal Probability Algorithm is discussed in the context of how it is used inside the present invention.

During the learning period the security program learns discreet and unique activities. An activity is defined as the smallest unit representation of user behavior. In the software program, an activity consists of (1). A string that holds the name of a process or executable program, (2). The time-segment during which the process was executed (a time segment is a 4 hr period, therefore there are 6 time segments in a 24-hr period), (3). The host name from which the process was executed, and (4). A flag showing whether or not an activity was executed during the weekend or on a weekday. These variables concatenated together represent discreet activity. Other variables can be appended to an activity structure such as websites visited, memory use per program, keystrokes, etc; although not every variable is a good reflection of a user's behavior. A user's behavior is represented as a set of discreet activity structures that are built during the learning period. During the learning period, a data structure called the PGraph structure attempts to incrementally build a representation of all the activities that a user will exhibit and all these activities are represented by the activity structures which are strings that contain data under the 4 variables above. After the learning period is up, the algorithm would have constructed a computational set that consists of everything that was recorded during the learning period.

The defining assumption behind the validity of this algorithm is that for it to work correctly, it must hold true that a computer user tends to exhibit behavior in a recurring manner. If a user satisfies this requirement—that his/her behavior follows a deterministic recurring pattern—then if the user exhibits activity behavior that falls outside the set of activities learned earlier during the learning session, such activity will be seen as "unusual" because such an activity has never been seen before. In the software program this will happen when a new activity is created after the learning period is over. The other case in which someone behaves suspiciously is when a previously exhibited activity is no longer exhibited for some fixed duration of time (This time is called the depreciation period or DP). If the user (after this fixed duration of time) attempts to exhibit such an activity again, it will be seen as "suspicious" and flagged as a security breach. The emulation of this phenomenon is accomplished by associating probability values with each activity structure in a users PGraph set. The probability values are all based on continuous time. At all times, for each activity structure, a continuous probability value is associated with the activity. This is called the continuous probability (CP).

$$ContinuousProbabilityActivity = AmountOfTimeActivityExecuted/TotalTimeUserLoggedIn$$

The above formula says that for each activity structure in a user's model, the algorithm continuously computes the continuous probability by dividing the time that such an activity has been executed by the total time that the user has remained logged in. This shows the relative frequency of use of the activity in question. Next, in order to impose a rule that says "after x hours, if an activity is no longer exhibited, the activity will be seen as abnormal", the algorithm needs to enforce an absolute minimum lower bound probability based on some fixed probability (absolute minimum probability, AMP). Therefore the program stores what is called the Fixed Normal Probability (FNP) and associates it with each activity structure. The FNP is computed immediately after the modeling time has reached zero. The continuous probability is always being updated during the lifetime of a user working on a computer. If a user is exhibiting activity A, then the continuous probability of A will either be on the increase or it will remain constant. On the other hand if activity A is not being exhibited, then the CP of A will always decrease because regardless of what happens if a user remains logged in, the TotalTimeUserLoggedIn value keeps increasing as time increases and progresses forward. The fixed normal probability for an activity is the normal rate of exhibition of that activity. Based on this value, the algorithm can determine at what point it wants to flag the activity if it is no longer being exhibited. Since if an activity is not being exhibited, then what will happen to its continuous probability? Well since the CPNumerator will remain fixed and the CPDenominator will increase the resulting continuous probability will decrease. Therefore the FNP is: FNP=FNPNumerator/FNPDenominator=TimeActivityExhibitedDuringLearningPeriod/Total time Taken during the learning period.

Next, the algorithm stores the fixed normal probability so that it can have a means of estimating the normal rate of exhibition of an activity. Based on the FNP value the algorithm can compute how long it should allow an activity to remain normal even if it is not being executed by the user. This time period is called the depreciation period, and it is such that it can be no greater that the FNPDenominator because that it is the total length of time used by the algorithm to learn about a users behavior. For example, if the FNPDenominator value is 40 hours, then that means that for the formula to hold true, the algorithm can set the depreciation period (DP) to fall within 0 to 40 hours, but no more than 40 hours. This means that if someone is being secured he is being secured based on what was learned during his last 40 hr learning period.

Therefore, Depreciation Period (DP), can be set as a decimal-fraction (lets call it K, 0<K<=1.0) multiple of the Learning period. So if the algorithm has learned for 40 hours, and it wants the DP period to be 30 hours: 40*K=30 hrs, K=30/40=0.75. The rules are that the DP can be no longer than the learning period. On the average, in the algorithm, the maximum learning period is set to be 432000 seconds=10 days of work. The medium k value is on average 0.6, making the average allowed depreciation period for any activity to be 0.6*432000=259200=72 hrs=3 days of not exhibiting an activity. After the DP is up the CP falls to the absolute minimum probability, which is the value of the CP when DP has expired.

Here are the key formulas:

$$FNP*K=AMP$$

$$FNPNumerator/FNPDenominator*K=AMP$$

0<K<=1.0

FNP, AMP are directly related to each other.

Therefore the 2 most important variables are

1. FNPDenominator=Total Learning Period
2. K—The closer K is to 1, the longer the depreciation period->lower sensitivity, lower security—this is because it will take more time for a program to not be used, after which its probability will fall below AMP; on the other hand the closer k is to 0, the higher the sensitivity, and security because less time will be allowed for non-exhibition of an activity, after which it will be flagged.

Note that if the FNPDenominator gets too large then that means that it will take much longer times for continuous probability to approach the AMP. Therefore this should be regulated by pruning. The algorithm prunes by dividing all numbers by 2 whenever the total modeling time ever goes beyond 432000 seconds.

Applicants' invention (FIG. 1) is a method of preventing unauthorized access to a computer system, whether that system is a single central processing unit or a network of computers. The method provides self-security. That is, the method consists of continuous scrutiny and authentication of all users by the very system that is the object of protection. The method is not external, i.e., mechanically locked offices and keyboards. The method is internal; it protects a system even after external defenses have been breached and even after the first internal defense, the logon procedure, has been breached with a pilfered password or smart card.

The present inventions' security method begins with construction of use (block 110) and personality profiles (block 100). Because a user must have used some authorization code, key, password or other identifying feature to access the system, the present invention initially considers each user to be authorized. But as soon as a user begins using the protected system, the present invention begins compiling a history of use unique to that user. The history can consist of keystroke sequences, applications, data accessed, drivers exercised, or any other indicia of use. The present invention applies a probability model to the indicia, creates a probabilistic record, and stores it as a use profile unique to that particular user. The present invention carries out behavioral modeling using the fixed normal probability algorithm described in detail above.

Before, during, or after the period in which the present invention builds the use profile, it engages the user in an interactive natural language learning session in which the present invention converses with the user in natural language and builds a unique knowledge personality profile of that particular user (block 100).

This artificial intelligence engine consists of the following four major subsystems: (1.) Isolation Reduction Engine (block 220), (2.) Computation Search Engine (or C-graph) (block 230), (3.) Stimulus Context Resolution Engine (block 240), and (4.) Autonomous Knowledge Base (block 250). These sub-systems are described above. In the learning session it gathers information about the user using natural language as the primary input-output interface. It presents various questions to the user, but also allows the user to input information of his own choosing, carrying out an intelligent dialogue. It stores the user's answers and the facts from the user dialog as variables. This Multiple Secure Variable aspect of Applicants' invention prevents a security breach by an unauthorized user who might know what questions it would ask, but would not be able to guess what free-form dialog an authorized user may have used during a learning session.

While building and storing use and personality profiles, Applicants' present invention continuously monitors selected indicia of all users (block 120) using its Detection Engine. The present invention compares such use of an individual real-time user to the unique use profile of the user whose authorization code, key, password, or other identifying feature was used by the real-time user to gain access. If the monitored use does not deviate from the profile more than a predetermined amount in a predetermined manner, the present invention authenticates the real-time user, and may update the use profile. If the monitored use deviates from the profile more than a predetermined amount in a predetermined manner—in accordance with the fixed normal probability anomaly detection algorithm—the present invention interrupts the session with an interrogation of the real-time user (blocks 130, 140).

The interrogation part (block 140) of Applicant's present invention is an interactive series of questions posed to a real-time user whose most recent use patterns diverged from the use profile of the user whose authorization code, key, password, or other identifying feature was used by the real-time user to gain access. The questions posed are derived from the personality profile of the user whose authorization code, key, password, or other identifying feature was used by the real-time user to gain access. Some of the questions are the same as those posed directly to the user during construction of his personality profile, and some are derived from inferences made during the construction of the personality profile. The interrogation part is carried out by reading the terminal structures in the autonomous database, and generating questions based on the atomic value.

If the interrogation answers do not deviate from the personality profile more than a predetermined amount in a predetermined manner, the present invention authenticates the real-time user and permits continued access (block 150). If the interrogation answers deviate from the profile more than a predetermined amount in a predetermined manner, the Applicants' present invention logs the real-time user off the computer system and denies him further access (block 160). Whenever suspicious activity is detected, the present invention sends a report to administrators in real time detailing everything that led up to the security breach. Administrators may investigate, and release user accounts using the security administration tool (block 170). This tool is a graphical user interface that can connect to the central server to pull reports and update security information for each user.

FIG. 24 shows the present invention securing a network of computer systems. The present invention secures computer systems against unauthorized access in a computer network. Each of the computers inside the network (2400) has an instance of the present invention. Whenever each user logs into any of the computers inside the network, the present invention retrieves the user's security data from the central server (2410) and begins executing the security method described in FIG. 1. Because of this network architecture, a user can be secured from any system on the network provided the present invention is installed on the computer system. This allows the present invention to retain the knowledge of a user's security regardless of what computer he/she logs into. Those skilled in the art of computer science will know that a computer system may include accounts, files, portals, buses, controllers, databases, internal and external memories, volatile and nonvolatile memories, device drivers, processors, applications, telecommunication connections, servers, laptops, hand helds, and any other device configured to connect to another computing device.

It should be appreciated that portions of the present invention may be implemented as a set of computer executable instructions (software) stored on or contained in a computer-readable medium. The computer readable medium may include non-volatile medium such as a floppy diskette, hard disk, flash memory card, ROM, CD-ROM, DVD, magnetic tape, or another suitable medium.

Although the present invention has been described with reference to specific embodiments, this description is not meant to be construed in a limited sense. Various modifications of the disclosed embodiments, as well as alternative embodiments of the inventions will become apparent to persons skilled in the art upon the reference to the description of the present invention. It is, therefore, contemplated that the appended claims will cover such modifications that fall within the scope of the present invention.

We claim:

1. A method for monitoring and protecting against unauthorized access of a computer system comprising:
   automatic monitoring of an authorized user's patterns of use of the computer system;
   constructing and storing, in a memory, a unique use profile of the authorized user based on said patterns of use;
   performing a free form natural language learning session with said authorized user;
   making inferences about a personality of the authorized user based on the free form natural language learning session;
   constructing and storing, in said memory, a unique personality profile of said authorized user based on the free form natural language learning session;
   continuously monitoring a real-time user patterns of use;
   comparing for deviation the real-time user's patterns of use to an assumed unique use profile, wherein the assumed unique use profile is assigned to an authorization code, key, password, or other identifying feature used by the real-time user to gain access;
   updating said unique use profile if the comparison deviation is no greater than a predetermined magnitude;
   interrogating the real-time user with questions from an assumed personality profile, wherein the assumed personality profile is assigned to an authorization code, key, password, or other identifying feature used by the real-time user to gain access if the comparison deviation is greater than the predetermined magnitude; and
   logging off the real-time user and blocking further access by the real-time user when interrogation responses do not match, to a predetermined level of accuracy, correct interrogation responses stored in said assumed personality profile assigned to an authorization code, key, password, or other identifying feature used by the real-time user to gain access.

* * * * *

UNITED STATES PATENT AND TRADEMARK OFFICE
CERTIFICATE OF CORRECTION

| | | |
|---|---|---|
| PATENT NO. | : 7,647,645 B2 | Page 1 of 1 |
| APPLICATION NO. | : 10/898129 | |
| DATED | : January 12, 2010 | |
| INVENTOR(S) | : Edeki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1572 days.

Signed and Sealed this

Sixteenth Day of November, 2010

David J. Kappos
*Director of the United States Patent and Trademark Office*